US007266807B2

(12) United States Patent
Takano et al.

(10) Patent No.: US 7,266,807 B2
(45) Date of Patent: Sep. 4, 2007

(54) METHOD FOR INTEGRATION EDITION OF SETTING FILE AND SETTING FILE INTEGRATION BASE

(75) Inventors: Hideki Takano, Yokohama (JP); Toshiaki Hirata, Kashiwa (JP); Hironori Emaru, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 658 days.

(21) Appl. No.: 10/640,026

(22) Filed: Aug. 14, 2003

(65) Prior Publication Data

US 2004/0148367 A1 Jul. 29, 2004

(30) Foreign Application Priority Data

Dec. 20, 2002 (JP) ............................. 2002-369834

(51) Int. Cl.
*G06F 9/44* (2006.01)

(52) U.S. Cl. ........................ 717/111; 717/110; 717/121; 717/113

(58) Field of Classification Search ........ 717/121–175; 714/38–47; 713/1; 709/214–313; 705/59; 703/13
See application file for complete search history.

(56) References Cited

U.S. PATENT DOCUMENTS

| | | | | |
|---|---|---|---|---|
| 5,790,778 | A * | 8/1998 | Bush et al. .................... | 714/38 |
| 6,066,182 | A * | 5/2000 | Wilde et al. ................. | 717/175 |
| 6,098,054 | A * | 8/2000 | McCollom et al. ........... | 705/59 |
| 6,151,567 | A * | 11/2000 | Ames et al. .................. | 703/13 |
| 6,636,961 | B1 * | 10/2003 | Braun et al. .................... | 713/1 |
| 6,760,755 | B1 * | 7/2004 | Brackett ...................... | 709/214 |
| 6,801,949 | B1 * | 10/2004 | Bruck et al. ................. | 709/232 |
| 2002/0138659 | A1 * | 9/2002 | Trabaris et al. ............. | 709/313 |
| 2003/0046616 | A1 * | 3/2003 | Feng et al. ................... | 714/47 |
| 2004/0049579 | A1 * | 3/2004 | Ims et al. .................... | 709/225 |
| 2005/0257214 | A1 * | 11/2005 | Moshir et al. .............. | 717/171 |
| 2006/0206866 | A1 * | 9/2006 | Eldrige et al. .............. | 717/122 |

FOREIGN PATENT DOCUMENTS

| | | |
|---|---|---|
| JP | 2001-134424 | 5/2001 |
| JP | 2002-149413 | 5/2002 |

* cited by examiner

*Primary Examiner*—Meng-Al T. An
*Assistant Examiner*—Mark P. Francis
(74) *Attorney, Agent, or Firm*—Mattingly, Stanger, Malur & Brundidge, P.C.

(57) ABSTRACT

A conventional configuration file edition method used for changing operation of a program that is operated on a computer involves a problem that a user is required to learn a complex method for changing a configuration file when a plurality of programs are provided in the form of one product because the method is different for respective programs. An intermediate configuration file that stores setting information of a configuration file, a method for forming a configuration screen, and a method for forming a configuration file is prepared, and provided to a configuration file integration base. The configuration file integration base provides an integrated configuration console to a user by use of the intermediate configuration file. The setting information is stored in the intermediate configuration file when a user changes the setting information on the integrated configuration console, and a configuration file is formed from the intermediate configuration file.

16 Claims, 22 Drawing Sheets

SYSTEM CONFIGURATIOIN DIAGRAM OF CONFIGURATION FILE INTEGRATED EDITING METHOD FOR SEPARATING CHANGE AND DISTRIBUTION OF SETTING INFORMATION

SYSTEM CONFIGURATION DIAGRAM OF CONFIGURATION FILE INTEGRATED EDITING METHOD

STRUCTURE OF COMPUTER

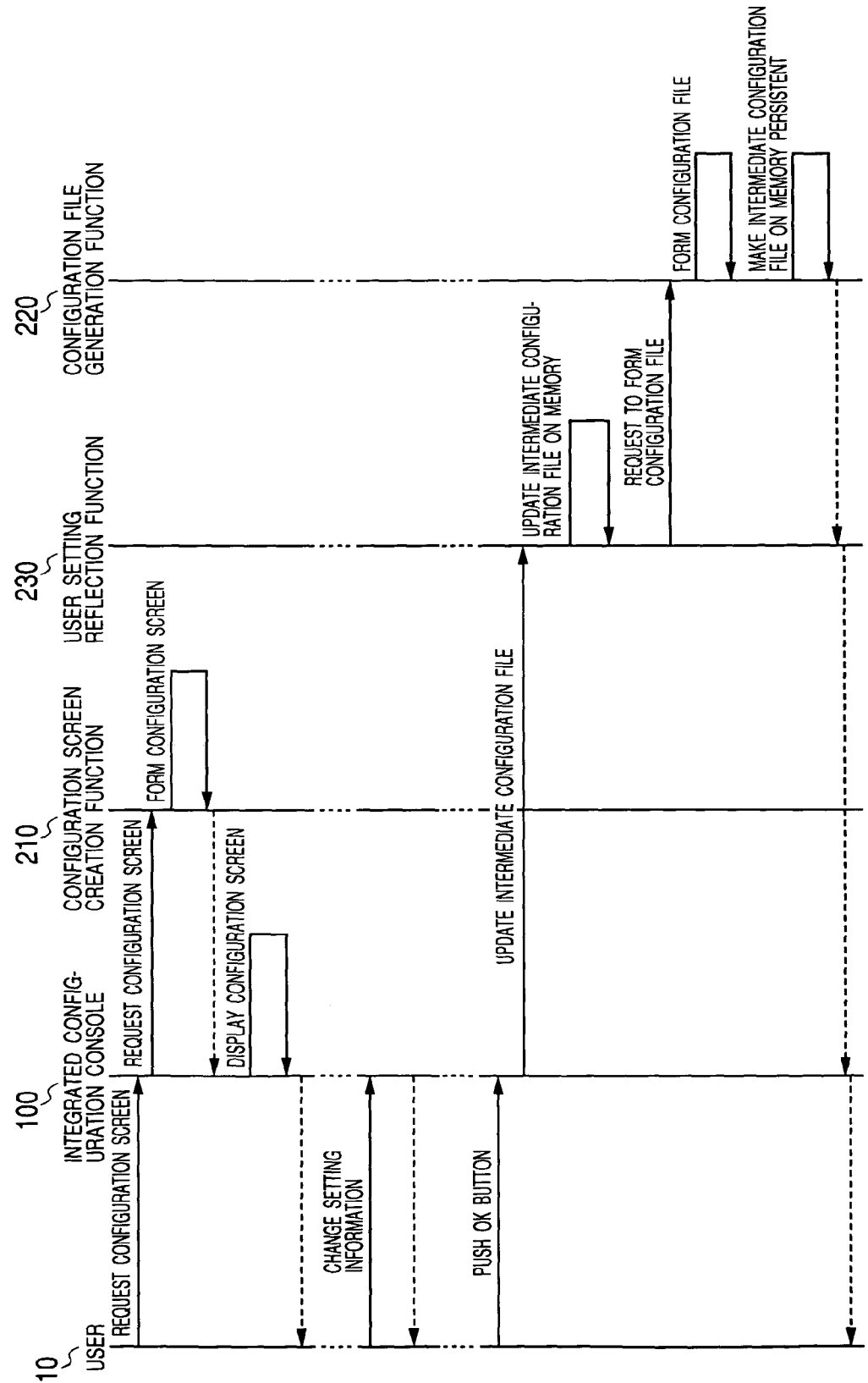

FIG. 4
EXAMPLE OF INTERMEDIATE SETTING FILE

```
          ⟨?xml version="1.0" encoding="Shift_JIS"?⟩
500 ——⟨configuration⟩
  510-1 ——⟨configurationfile⟩
    511-1 ——⟨cfpath⟩ C:¥Program Files¥PROGRAM 1 ⟨/cfpath⟩ ——511'-1
    512-1 ——⟨cfname⟩ CONFIGURATION FILE 1 ⟨/cfname⟩ ——512'-1
    520-1 ——⟨parameter⟩                                         ┌521'-1
      521-1 ——⟨name⟩ COMMUNICATION PORT NUMBER OF PROGRAM 2 ⟨/name⟩
      522-1 ——⟨value⟩ 900 ⟨/value⟩ ——522'-1
      523-1 ——⟨type⟩ int ⟨/type⟩ ——523'-1
      524-1 ——⟨method⟩ TextField ⟨/method⟩ ——524'-1
      525-1 ——⟨cfformat⟩ %name%=%value% ⟨/cfformat⟩ ——525'-1
    520'-1 ——⟨/parameter⟩
  510'-1 ——⟨/configurationfile⟩
  510-2 ——⟨configurationfile⟩
    511-2 ——⟨cfpath⟩ C:¥Program Files¥PROGRAM 2 ⟨/cfpath⟩ ——511'-2
    512-2 ——⟨cfname⟩ CONFIGURATION FILE 2 ⟨/cfname⟩ ——512'-2
    520-2 ——⟨parameter⟩
      521-2 ——⟨name⟩ PORT NUMBER ⟨/name⟩ ——521'-2
      522-2 ——⟨value⟩ 950 ⟨/value⟩ ——522'-2
      523-2 ——⟨type⟩ int ⟨/type⟩ ——523'-2
      524-2 ——⟨method⟩ TextField ⟨/method⟩ ——524'-2
      525-2 ——⟨cfformat⟩ %name%=%value% ⟨/cfformat⟩ ——525'-2
    520'-2 ——⟨/parameter⟩
  510'-2 ——⟨/configurationfile⟩
500' ——⟨/configuration⟩
```

PAD FOR FORMING CONFIGURATION SCREEN

SYSTEM CONFIGURATION DIAGRAM OF CONFIGURATION FILE INTEGRATED EDITING METHOD FOR SEPARATING CHANGE AND DISTRIBUTION OF SETTING INFORMATION

FIG. 8

EXAMPLE OF INTERMEDIATE CONFIGURATION FILE ADDED WITH UPDATE FLAG

```
                <?xml version="1.0" encoding="Shift_JIS"?>
500 ─── <configuration>
  510-1 ─── <configurationfile>
    511-1 ─── <cfpath> C:\Program Files\PROGRAM 1 </cfpath> ─── 511'-1
    512-1 ─── <cfname> CONFIGURATION FILE 1 </cfname> ─── 512'-1
    513-1 ─── <updateflag> true </updateflag> ─── 513'-1
    520-1 ─── <parameter>
      526-1 ─── <category> CATEGORY 1 </category> ─── 516'-1          521'-1
      521-1 ─── <name> COMMUNICATION PORT NUMBER OF PROGRAM 2 </name>
      522-1 ─── <value> 900 </value> ─── 522'-1
      523-1 ─── <type> int </type> ─── 523'-1
      524-1 ─── <method> TextField </method> ─── 524'-1
      525-1 ─── <cfformat> %name%=%value% </cfformat> ─── 525'-1
    520'-1 ─── </parameter>
  510'-1 ─── </configurationfile>
  510-2 ─── <configurationfile>
    511-2 ─── <cfpath> C:\Program Files\PROGRAM 2 </cfpath> ─── 511'-2
    512-2 ─── <cfname> CONFIGURATION FILE 2 </cfname> ─── 512'-2
    513-2 ─── <updateflag> false </updateflag> ─── 513'-2
    520-2 ─── <parameter>
      525-1 ─── <category> CATEGORY 2 </category> ─── 521'-1
      521-2 ─── <name> PORT NUMBER </name> ─── 521'-2
      522-2 ─── <value> 950 </value> ─── 522'-2
      523-2 ─── <type> int </type> ─── 523'-2
      524-2 ─── <method> TextField </method> ─── 524'-2
      525-2 ─── <cfformat> %name%=%value% </cfformat> ─── 525'-2
    520'-2 ─── </parameter>
  510'-2 ─── </configurationfile>
500' ─── </configuration>
```

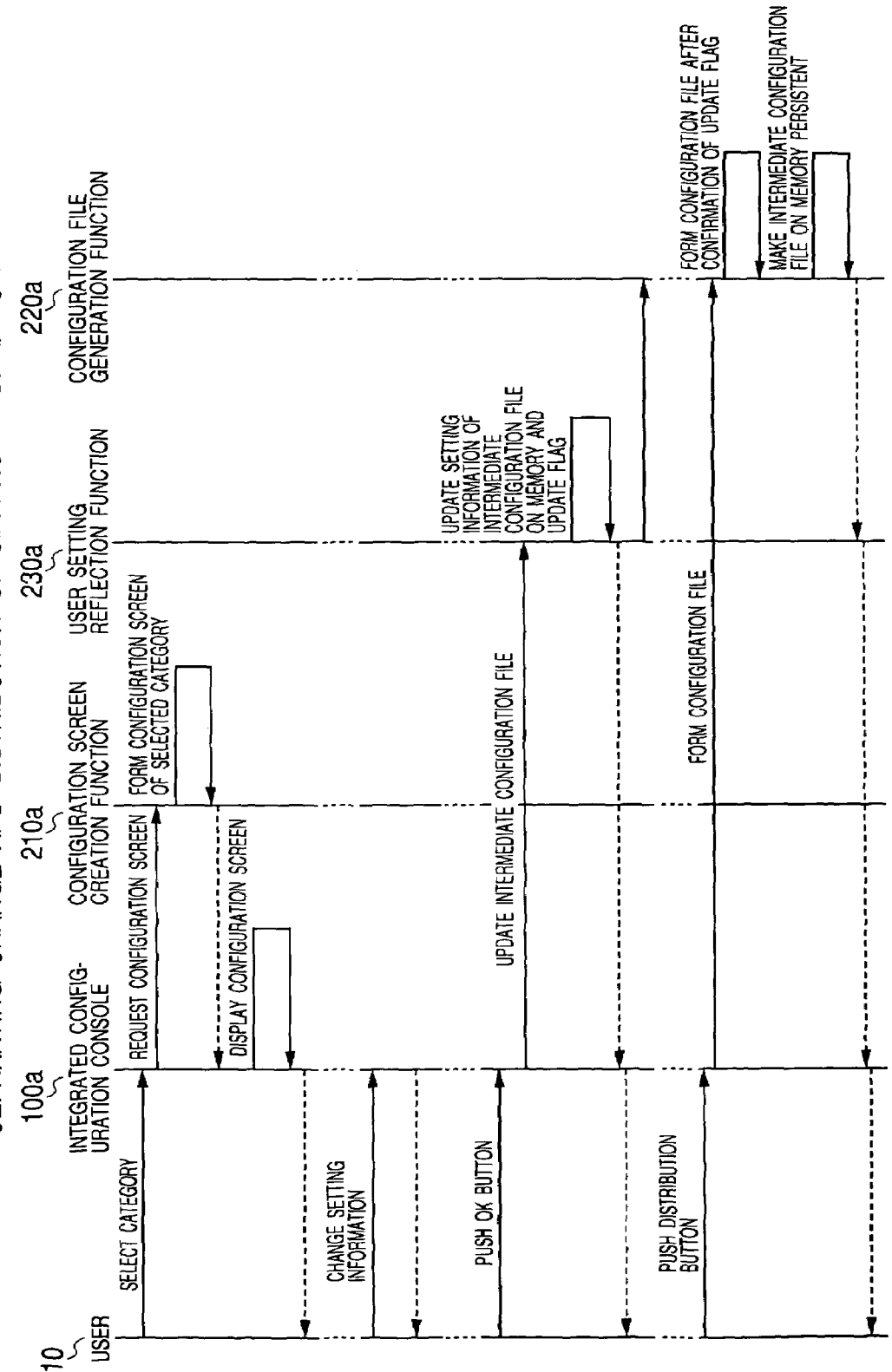

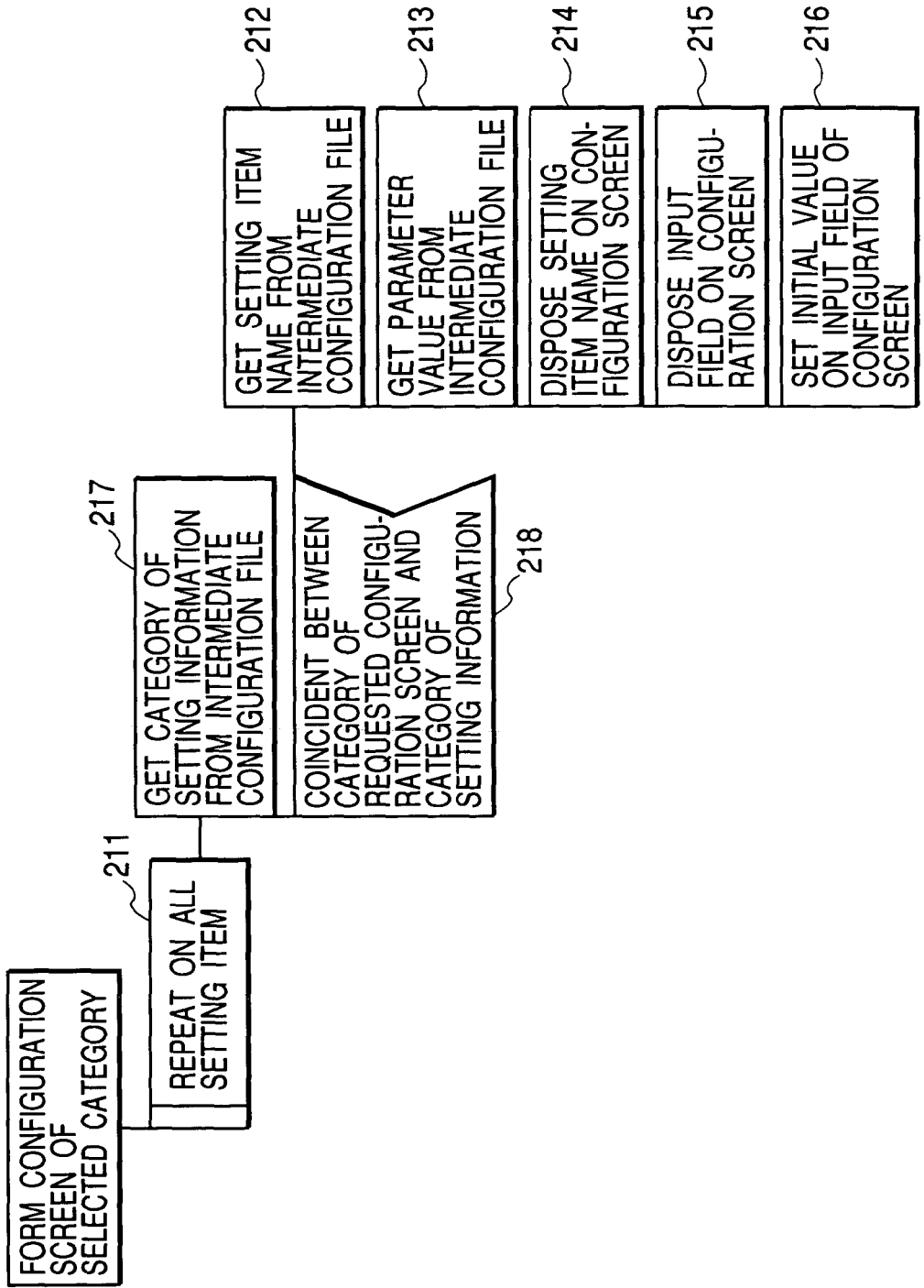

PAD FOR FORMING CONFIGURATION FILE AFTER CONFIRMATION OF UPDATE FLAG

SYSTEM CONFIGURATION DIAGRAM OF CONFIGURATION FILE INTEGRATED EDITING METHOD COVERING PLURAL COMPUTERS

SYSTEM CONFIGURATION DIAGRAM OF CONFIGURATION FILE INTEGRATED EDITING METHOD FOR AUTOMATIC REACTIVATION OF SETTING TARGET PROGRAM AFTER CONFIGURATION FILE CHANGE

FIG. 17

EXAMPLE OF INTERMEDIATE CONFIGURATION FILE
ADDED WITH SETTING TARGET PROGRAM NAME

```
                ⟨?xml version="1.0" encoding="Shift_JIS"?⟩
500 ⸺ ⟨configuration⟩
530-1 ⸺ ⟨program⟩
    531-1 ⸺ ⟨name⟩ C:¥Program Files¥PROGRAM 1¥PROGRAM 1.exe ⟨/name⟩ ⸺ 531'-1
    510-1 ⸺ ⟨configurationfile⟩
        511-1 ⸺ ⟨cfpath⟩ C:¥Program Files¥PROGRAM 1 ⟨/cfpath⟩ ⸺ 511'-1
        512-1 ⸺ ⟨cfname⟩ CONFIGURATION FILE 1 ⟨/cfname⟩ ⸺ 512'-1
        520-1 ⸺ ⟨parameter⟩                                                  521'-1
            521-1 ⸺ ⟨name⟩ COMMUNICATION PORT NUMBER OF PROGRAM 2 ⟨/name⟩
            522-1 ⸺ ⟨value⟩ 900 ⟨/value⟩ ⸺ 522'-1
            523-1 ⸺ ⟨type⟩ int ⟨/type⟩ ⸺ 523'-1
            524-1 ⸺ ⟨method⟩ TextField ⟨/method⟩ ⸺ 524'-1
            525-1 ⸺ ⟨cfformat⟩ %name%=%value% ⟨/cfformat⟩ ⸺ 525'-1
        520'-1 ⸺ ⟨/parameter⟩
    510'-1 ⸺ ⟨/configurationfile⟩
530'-1 ⸺ ⟨/program⟩
530-2 ⸺ ⟨program⟩
    531-2 ⸺ ⟨name⟩ C:¥Program Files¥PROGRAM 2¥PROGRAM 2.exe ⟨/name⟩ ⸺ 531'-2
    510-2 ⸺ ⟨configurationfile⟩
        511-2 ⸺ ⟨cfpath⟩ C:¥Program Files¥PROGRAM 2 ⟨/cfpath⟩ ⸺ 511'-2
        512-2 ⸺ ⟨cfname⟩ CONFIGURATION FILE 2 ⟨/cfname⟩ ⸺ 512'-2
        520-2 ⸺ ⟨parameter⟩
            521-2 ⸺ ⟨name⟩ PORT NUMBER ⟨/name⟩ ⸺ 521'-2
            522-2 ⸺ ⟨value⟩ 950 ⟨/value⟩ ⸺ 522'-2
            523-2 ⸺ ⟨type⟩ int ⟨/type⟩ ⸺ 523'-2
            524-2 ⸺ ⟨method⟩ TextField ⟨/method⟩ ⸺ 524'-2
            525-2 ⸺ ⟨cfformat⟩ %name%=%value% ⟨/cfformat⟩ ⸺ 525'-2
        520'-2 ⸺ ⟨/parameter⟩
    510'-2 ⸺ ⟨/configurationfile⟩
530'-2 ⸺ ⟨/program⟩
500' ⸺ ⟨/configuration⟩
```

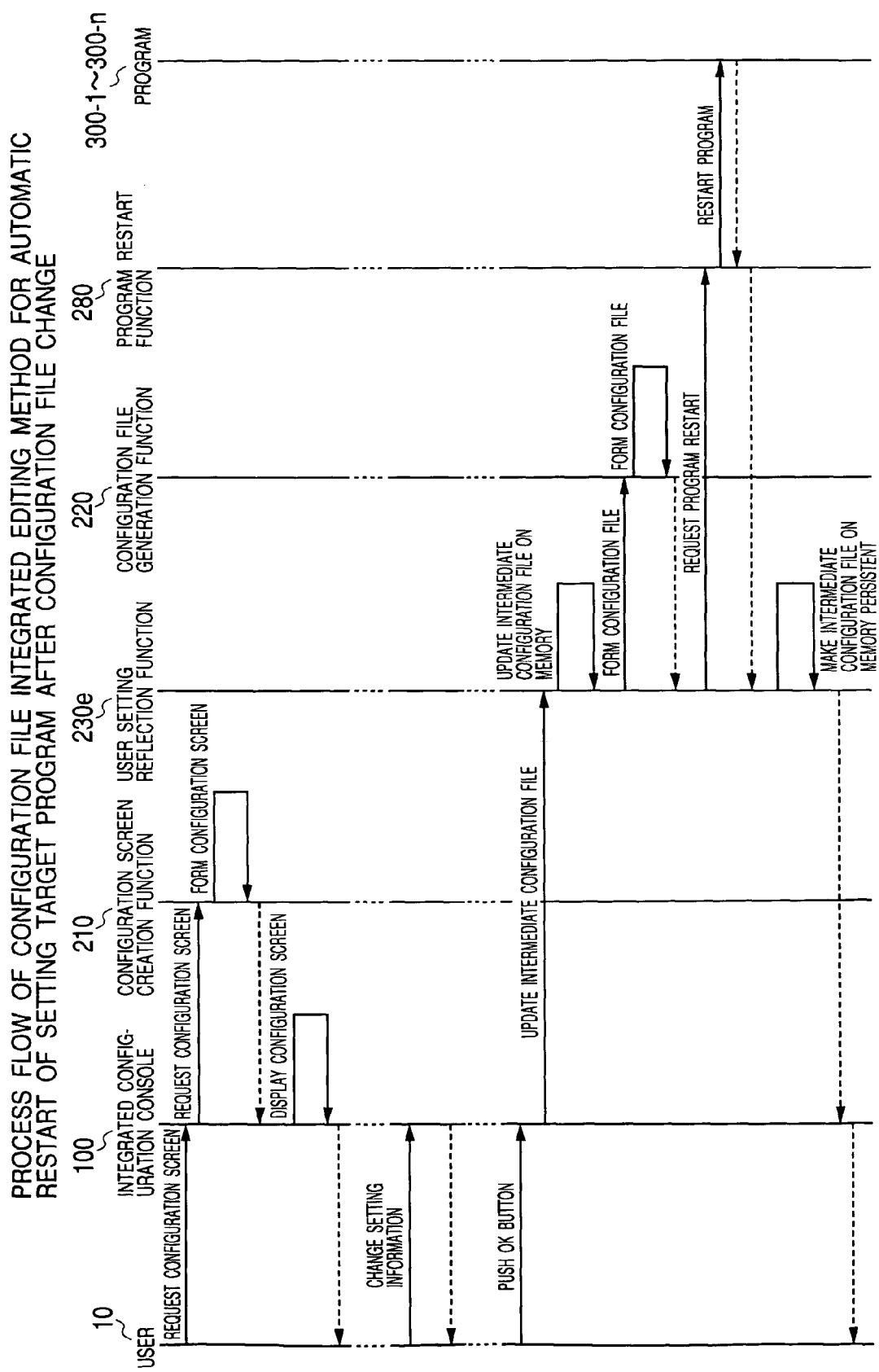

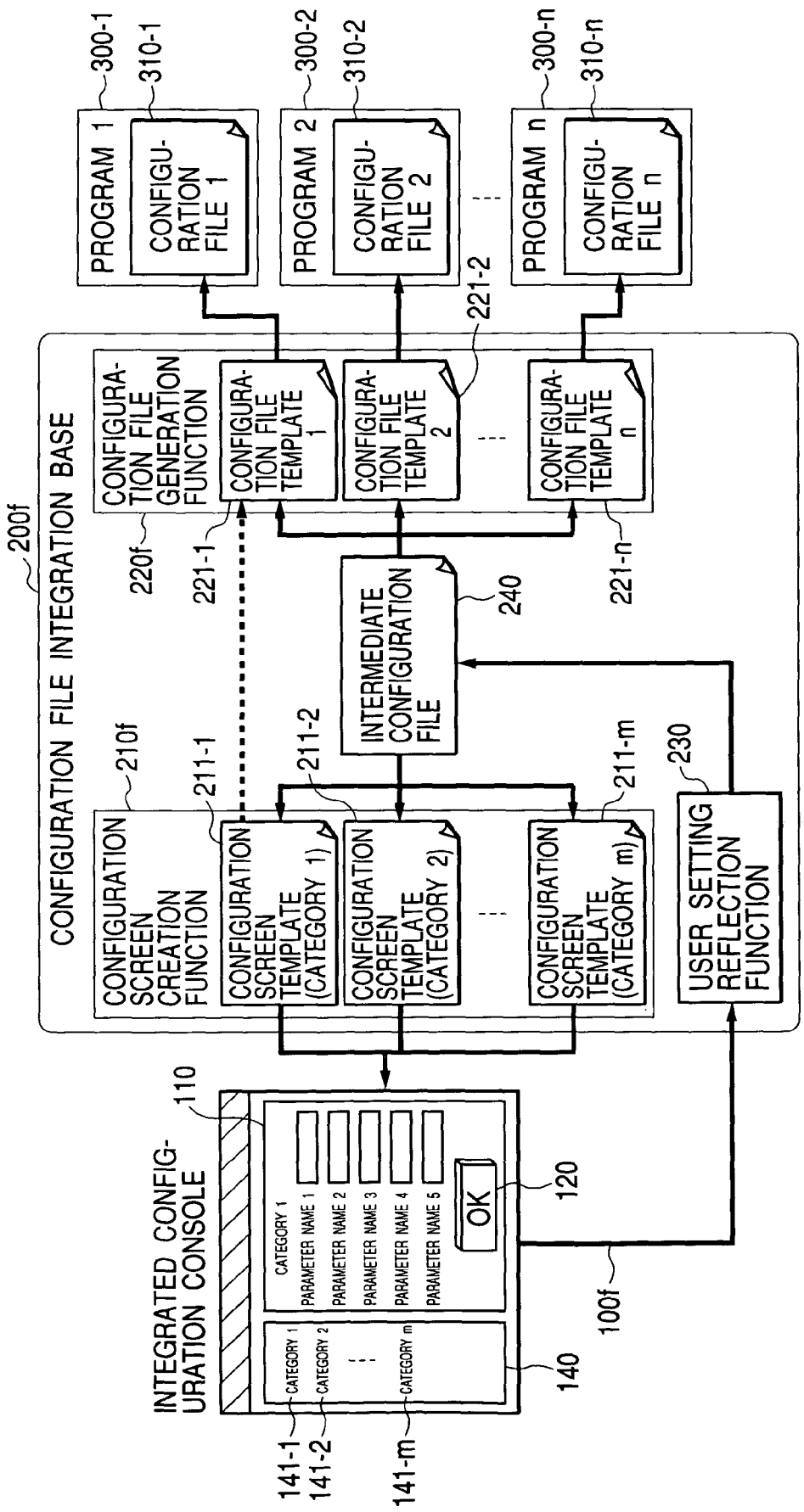

FIG. 20

EXAMPLE OF INTERMEDIATE CONFIGURATION FILE FOR OMITTING OUTPUT METHOD TO CONFIGURATION SCREEN FORMING INFORMATION AND CONFIGURATION FILE

```
          〈?xml version="1.0" encoding="Shift_JIS"?〉
500 ──〈configuration〉
  510-1 ──〈configurationfile〉
    511-1 ──〈cfpath〉 C:¥Program Files¥PROGRAM 1〈/cfpath〉──511'-1
    512-1 ──〈cfname〉 CONFIGURATION FILE 1〈/cfname〉──512'-1
    520-1 ──〈parameter〉                                              521'-1
      521-1 ──〈name〉 COMMUNICATION PORT NUMBER OF PROGRAM 2〈/name〉
      522-1 ──〈value〉 900 〈/value〉──522'-1
      523-1 ──〈type〉 int 〈/type〉──523'-1
    520'-1 ──〈/parameter〉
  510'-1 ──〈/configurationfile〉
  510-2 ──〈configurationfile〉
    511-2 ──〈cfpath〉 C:¥Program Files¥PROGRAM 2〈/cfpath〉──511'-2
    512-2 ──〈cfname〉 CONFIGURATION FILE 2〈/cfname〉──512'-2
    520-2 ──〈parameter〉
      521-2 ──〈name〉 PORT NUMBER 〈/name〉──521'-2
      522-2 ──〈value〉 950 〈/value〉──522'-2
      523-2 ──〈type〉 int 〈/type〉──523'-2
    520'-2 ──〈/parameter〉
  510'-2 ──〈/configurationfile〉
500' ──〈/configuration〉
```

EXAMPLE OF RELATION BETWEEN PROGRAM 1 AND PROGRAM 2

EXAMPLE OF CONFIGURATION SCREEN FOR DISPLAYING CANDIDATES

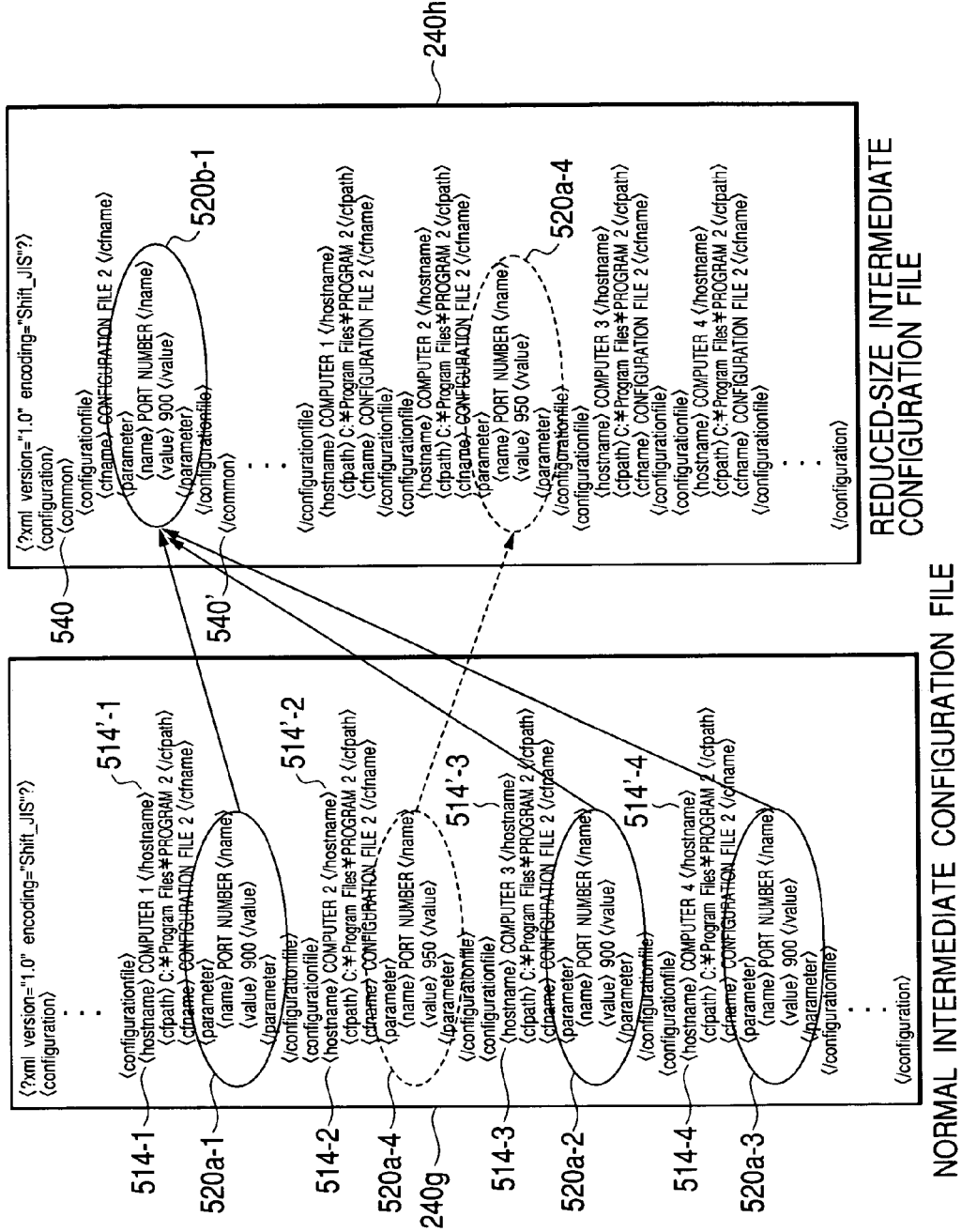

METHOD FOR INTEGRATION EDITION OF SETTING FILE AND SETTING FILE INTEGRATION BASE

BACKGROUND OF THE INVENTION

1. Field of the Invention

This invention relates to one of various formats used for changing the program operation and relates to edition of a plurality of types of configuration files.

2. Description of the Related Art

Heretofore, a program has been set by editing a configuration file for providing the program by means of a text editor or by editing a configuration file by use of a configuration screen provided by the program.

Japanese Published Unexamined Patent Application No. 2001-134424 discloses a method in which the definition information description rule, the structure information used for GUI forming, and the set value and candidate are stored in a DB, GUI forming program forms GUI by use of the information stored in the DB, and the text forming program forms the definition information to change the definition information of the system from one GUI. Hence, a definition information of a different format can be changed only by changing the definition information description rule in a DB (without change of a GUI forming program and a text forming program).

Japanese Published Unexamined Patent Application No. 2002-149413 discloses a method in which a plurality of cluster software refers one system definition information stored in a common disc and as the result a user can set a program only by changing the system definition information. This method brings about saving of setting work.

The format of configuration file of a program is different and the operation procedure of the configuration screen of a program is different depending on the type of a program. Therefore, a user is involved in a problem of learning respective edition methods of configuration files of programs to use a product in which a plurality of programs are stored in one package.

Furthermore, to edit a configuration file stored in another computer through a network, it is necessary to previously activate a computer having a configuration file.

When various setting information is edited by use of a provided integrated editing screen directly, it is necessary that the configuration screen forming method from a configuration file and change of a configuration file for setting information change on a configuration screen are formed individually for the type of configuration file.

Japanese Published Unexamined Patent Application No. 2001-134424 discloses a method in which the definition information format difference can be absorbed by the definition information description rule stored in a DB. However, this invention cannot involve a plurality of types of configuration files (definition information).

Furthermore, Japanese Published Unexamined Patent Application No. 2002-149413 discloses a method in which it is necessary that the cluster software is changed so as to refer the system definition information of a common disc to change the setting target cluster software. This invention is not suitable for changing all the programs because a plurality of types of programs are the targets for setting.

SUMMARY OF THE INVENTION

The object of the present invention is to handle various types of programs files in the same strategy without changing existing configuration files.

An intermediate configuration file that stores various types of configuration files is prepared to absorb differences between various types of configuration files, and the setting information of various types of configuration files is described in the intermediate configuration file. The configuration file forming method for one or more types of configuration files is described in the intermediate configuration file. The intermediate configuration file is given to a configuration file integration base program. The configuration file integration base provides an integrated configuration console to a user by use of the intermediate configuration file. The user changes the setting information by use of the integrated configuration console. The setting information that has been changed by the user is stored in the intermediate configuration file. A configuration file is formed from the intermediate configuration file. The formed configuration file is disposed on the place (directory) that can be referred by a program that uses the configuration file.

Other features of the present invention will be apparent with referring to the specification and attached drawings.

BRIEF DESCRIPTION OF THE DRAWINGS

FIG. 3 is a diagram showing a process flow of the configuration file integrated editing method;

FIG. 4 is a diagram showing an example of the intermediate configuration file;

FIG. 8 is a diagram showing an example of intermediate configuration file to which an update flag is added;

FIG. 9 is a diagram showing a process flow of the configuration file integrated editing method for changing and distributing the setting information;

FIG. 10 is a PAD for forming a configuration screen for selected category;

FIG. 17 is a diagram showing an example of intermediate configuration file to which a setting target program name is added;

FIG. 18 is a diagram showing a process flow of the configuration file integrated editing method for automatic restert of a setting target program after the configuration file is changed;

FIG. 19 is a system configuration diagram of the configuration file integrated editing method for forming the configuration screen and configuration file flexibly;

FIG. 20 is a diagram showing an example of intermediate configuration file from which the example of configuration screen forming information and the output method to a configuration file are omitted;

FIG. 23 is a diagram showing an example of intermediate configuration file that is reduced in size.

DESCRIPTION OF THE PREFERRED EMBODIMENTS

Embodiment 1

Figure 1:
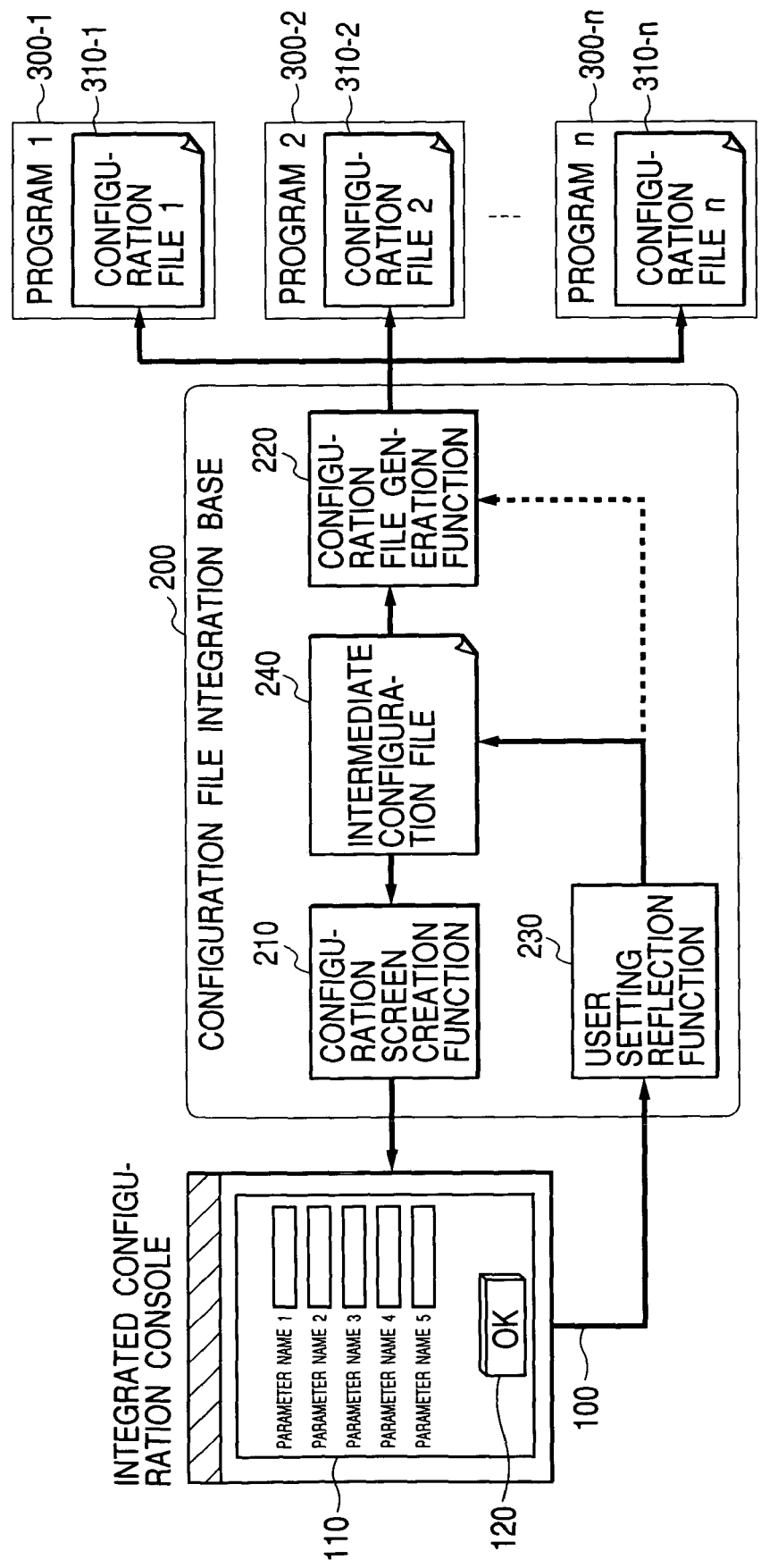
FIG. 1 is a system configuration diagram of a configuration file integrated editing method.
Figure 2:
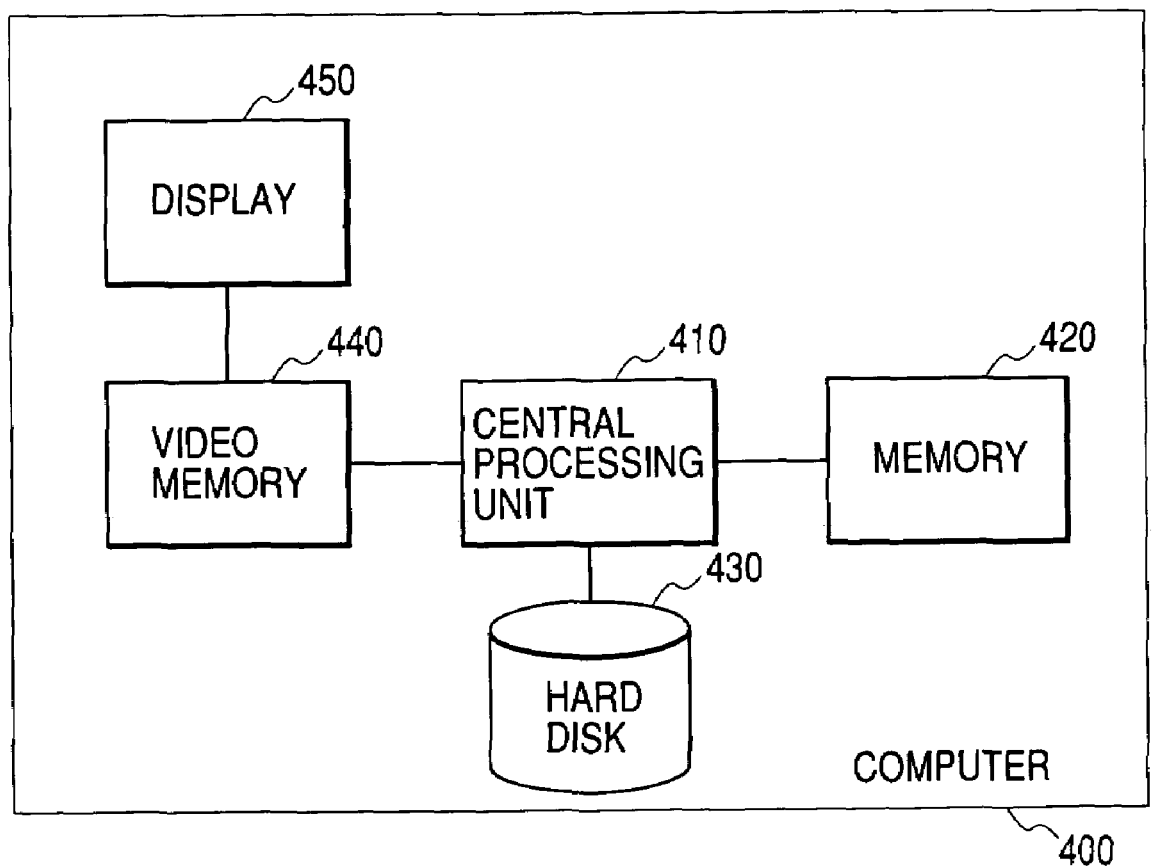
FIG. 2 is a diagram showing the structure of a computer.

FIG. 1 is a diagram showing the system configuration for a configuration file integrated editing method. Each function of the system is realized as a program that is executed on a computer. A computer 400 is provided with components as shown in FIG. 2. The computer 400 has a central processing unit 410. The central processing unit 410 executes calculation according to the program. A memory 420 and hard disk 430 stores programs and data. The information stored in the memory 420 volatilizes when the power source of the computer 400 is shut down, but the information stored in the hard disk 430 does not volatilize even when the power source of the computer 400 is shut down. A video memory 440 is a memory for displaying on a display 450. The components of the system for the configuration file integrated editing method are stored in the hard disk 430, and these components are read out on the memory 420 as required for execution. A program on the memory 420 operates the video memory 440 when a notice is displayed on the display 450 for a user.

The components shown in FIG. 1 will be described hereunder. An integrated configuration console comprises a configuration screen 110. Various setting information in configuration files 310-1 to 310-n of programs 300-1 to 300-n are set on the configuration screen 110. The configuration screen 110 is provided with an OK button 120, and a user change is reflected on the configuration files 310-1 to 310-n when a user pushes this button. To render the configuration files 310-1 to 310-n integration editable, the variously formatted setting information in the configuration files 310-1 to 310-n is stored in a standard-formatted intermediate configuration file 240 and provided in a configuration file integration base 200.

The basic element of the configuration file has been determined. Therefore, it is possible to determine the item to be stored in the intermediate configuration file. For example, how to input the setting information and how to store in the file, which are elements of the intermediate file, can be determined previously.

The intermediate file 240 is read out on the memory for using during execution of the configuration file integration base 200. A configuration screen creation function 210 uses the intermediate configuration file 240 on the memory 420 to form the configuration screen 110. When a user changes the setting information, a user setting reflection function 230 changes the intermediate configuration file 240. A broken line shows the process flow. In detail, the broken line means that the user setting reflection function calls a configuration file generation function 220. The configuration file generation function 220 uses the changed intermediate configuration file 240 to form configuration files 310-1 to 310-n, and distributes them to the programs 300-1 to 300-n.

FIG. 3 is a sequence diagram showing a process flow. A user 10 requests the configuration screen 110 through the integrated configuration console 100. The configuration screen creation function 210 forms the configuration screen 110. The formed configuration screen 110 is displayed on the integrated configuration console 100. Then, the user 10 changes the setting information on the configuration screen 110 of the integrated configuration console 100. After completion of the change of all the setting information to be changed in the configuration screen, the user 10 pushes the OK button 120. The setting information that has been set by the user is reflected on the intermediate configuration file 240 on the memory 420 in the user setting reflection function 230. When the user setting reflection function 230 requests the configuration file generation function 220 to form a configuration file, the configuration file generation function 220 forms configuration files 310-1 to 310-n. Finally, the intermediate configuration file 240 on the memory 420 is rendered persistent. The term "persistent" means that the information on the memory 420 is written in the hard disk 430.

FIG. 4 shows an example of intermediate configuration file 240 that is represented by XML. A plurality of pieces of setting information of a configuration file are described in the range <configuration>500~</configuration>500'. The setting information of one configuration files 310-1 to 310-n is summarized in the range <configurationfile>510~</configurationfile>510'. The directory of the hard disk 430 for storing the configuration files 310-1 to 310-n is set in the range <cfpath>511~</cfpath>511'. The file name of each configuration files 310-1 to 310-n is described in the range <cfname>512~</cfname>512'. The range <parameter>520~520' represents the setting information. The range <name>521~</name>521' represents the name of the setting information. The range <value>522~</value>522' represents the value of the setting information. The range <type>523~</type>523' represents the value type of the setting information. A plurality of types such as int (integer) and string (character string) are used for checking the user input. The configuration screen forming method is described in the range <method>524~</method>524'. Input methods such as TextField, TextArea, SelectBox, CheckBox, and RadioButton are used. The output method for outputting to the configuration files 310-1 to 310-n is described in the range <cfformat>525~</cfformat>525'. In this example, it is represented that the name of setting information described in <name>521 is linked to the value described in <value>522.

Figure 5:
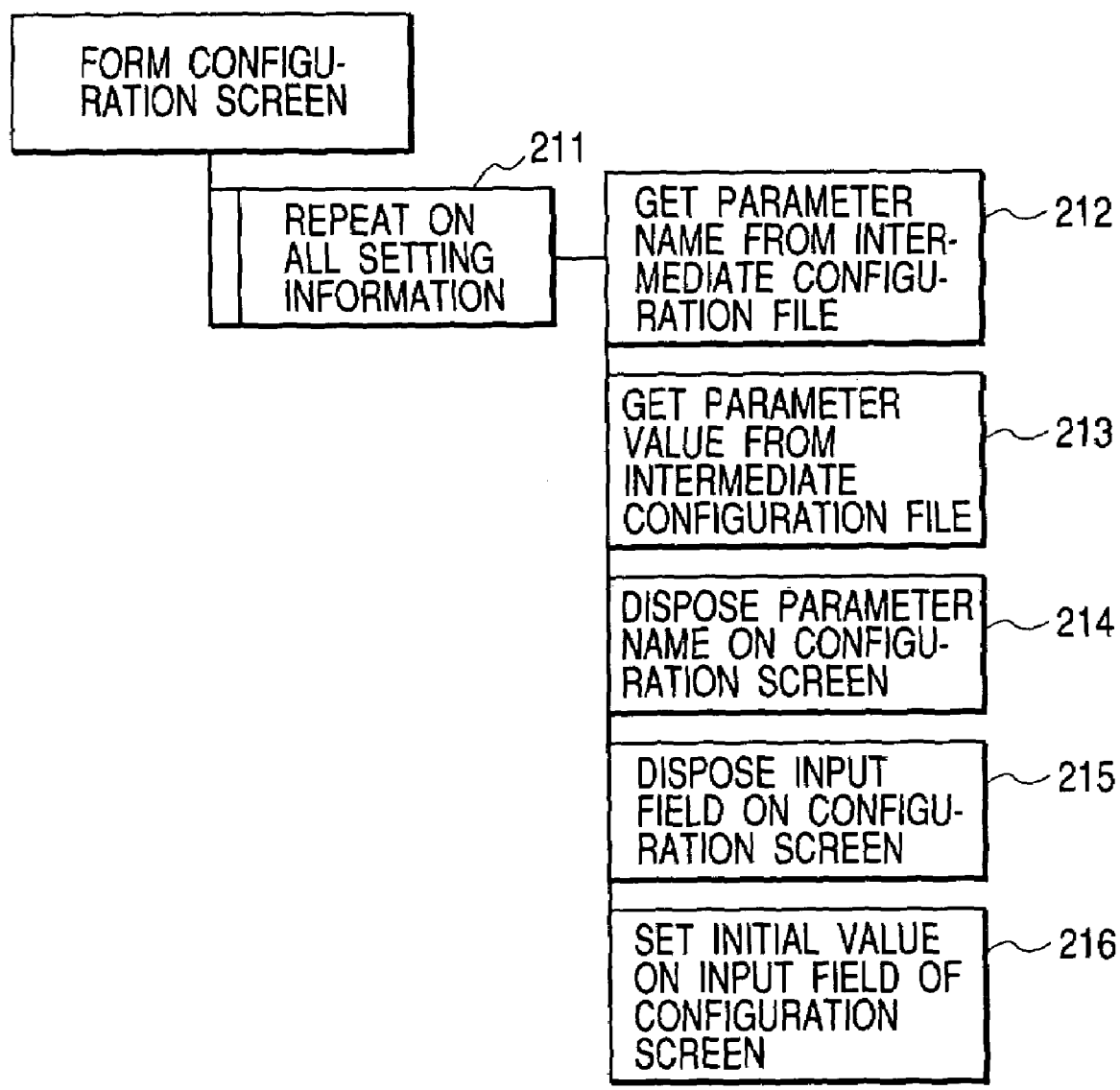
FIG. 5 is a PAD for forming a configuration screen

FIG. 5 shows a PAD for forming the configuration screen. The following processing is repeated on all the setting information in the intermediate configuration file 240 (<parameter>520) in the step 211 "repeat on all the setting information". At first, the parameter name (<name>521) is got in step 212 "get parameter name from intermediate configuration file". Next, a value that has been set in <value>522 is got from the intermediate configuration file 240 in step 213 "get parameter value from intermediate configuration file". The getd parameter name is disposed on the configuration screen 110 to be formed in step 214 "dispose parameter name on configuration screen ". Next, the configuration screen forming method (<method> 524) is got in step 215 "dispose input field on configuration screen", and the input filed that is marked there is disposed on the configuration screen 110. Finally, a parameter value got as an initial value is set on the input field that has been disposed on the configuration screen 110 in step 216 "set initial value on input field of configuration screen ".

Figure 6:
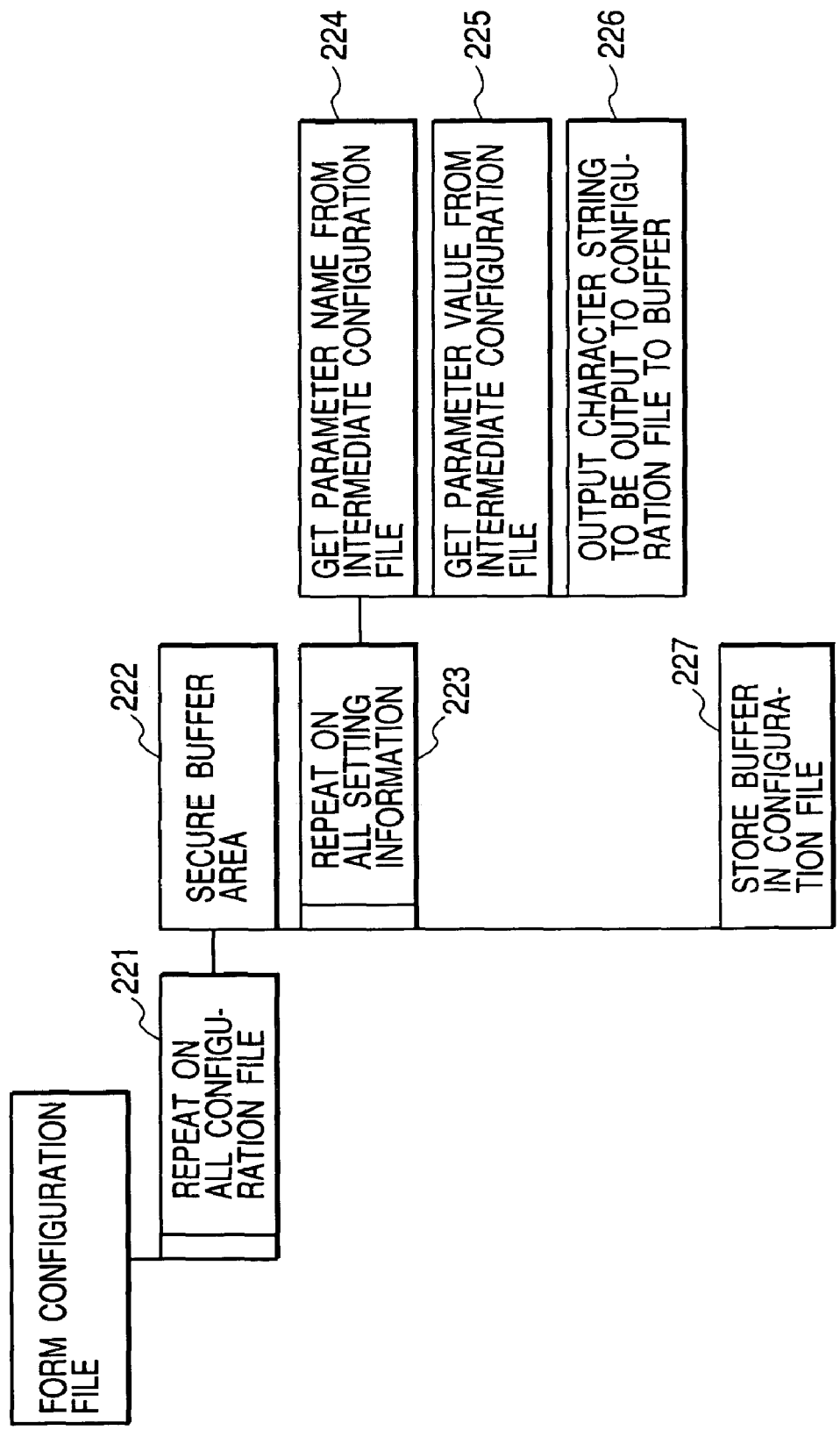
FIG. 6 is a PAD for forming configuration file.

FIG. 6 shows a PAD for forming configuration file. The following processing is repeated in step 221 "repeat on all the configuration file". At first, a working buffer area is secured on the memory 420 in step 222 "secure buffer area". Next, step 224 "get item name from intermediate configuration file", step 225 "get parameter value from intermediate configuration file", and step 226 "output string to be output to configuration file to buffer" are repeated for each setting information in step 223 "repeat on all the setting information". In step 226 "output string to be output to configuration file to buffer", the string formed according to the output method to the configuration files 310-1 to 310-$n$ (<cfformat>524) is output to the buffer. After completion of processing on all the setting information 310-1 to 310-$n$, the content of the buffer is stored as the configuration file name that has been set in <cfname>512 in the directory that has been set in<cfpath>511 instep 227 "store buffer in configuration file".

Effect of Embodiment 1

Only one configuration screen is sufficient to edit the configuration file without changing the format of a plurality of types of configuration files 310-1 to 310-$n$ because the intermediate configuration file absorbs the difference between respective configuration files.

Embodiment 2

Embodiment 2 will be described hereunder in which the time required for setting information change is minimized so as to shorten the waiting time of a user 10 in setting information changing and time consuming processing is carried out later collectively differently from the embodiment 1. In detail, only the intermediate configuration file setting is carried out at first, and it is not necessary for a user to wait for reflection of the change on the configuration file on the program in setting information changing.

Figure 7:
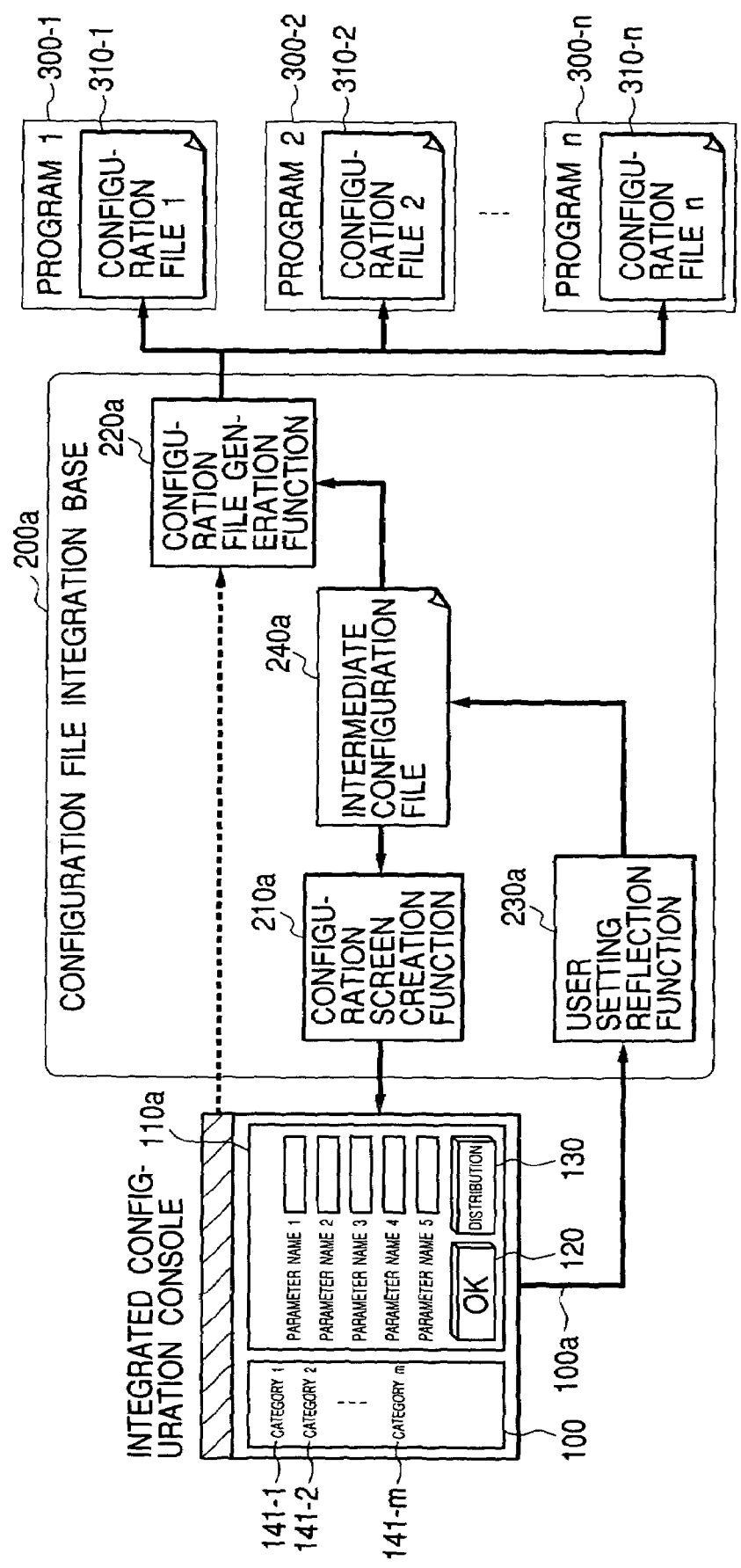
FIG. 7 is a system configuration diagram of the configuration file integrated editing method for changing and distributing the setting information.

FIG. 7 is a system configuration diagram. An integrated configuration console 100$a$ comprises a category selection screen 140 and a configuration screen 110$a$. The configuration screen 110 that is formed by a configuration screen creation function 210$a$ is provided with an OK button 120 and a distribution button 130. When the OK button 120 is pushed after setting information change, the user setting reflection function 230$a$ only updates the intermediate configuration file on a memory 420. When the distribution button 130 is pushed, the configuration file generation function 220$a$ forms configuration files 310-1 to 310-$n$ and renders an intermediate configuration file 240$a$ on the memory 420 persistent.

FIG. 8 shows an example of intermediate configuration file 240$a$. An update flag <updateflag>513~</updateflag>513' is provided for each <configuration file>510~</configuration file>510' that represents the configuration file. This update flag represents whether it is necessary to update the configuration files 310-1 to 310-$n$ or not. "true" represents that it is necessary to update the configuration file, and "false" represents that it is not necessary to update the configuration file.

Furthermore, <category>526~</categrory> 526' is provided for each <parameter>520~520' that represents the setting information. This is used when the configuration screen 110$a$ for respective categories 141-1 to 141-$m$ is formed.

The category is used for, for example, categorizing the parameter name of the network to display it on the configuration screen in the case including many parameter names. The category is used for easy input. A plurality of necessary categories are selected successively for one configuration file. A different information name is displayed for each selected category.

The process flow is shown in FIG. 9. A user 10 selects a category in the category selection screen 140 of the integrated configuration console 100$a$. The configuration screen creation function 210$a$ is requested for the configuration screen 110$a$ of the categories 141-1 to 141-$m$ on the integrated configuration console 100$a$. The configuration screen creation function 210$a$ forms the configuration screen 110$a$ of the selected categories 141-1 to 141-$m$, and the formed configuration screen 110$a$ is displayed on the integrated configuration console 100$a$. After the configuration screen 110$a$ is displayed, the user 10 changes the setting information through the integrated configuration console 100$a$. The user 10 changes all the setting information to be changed on the configuration screen 100$a$, and then pushes the OK button 120. The user setting reflection function 230$a$ reflects the changed setting information on the setting information and update flag in the intermediate configuration file 240$a$ in the memory 420. After the setting information to be changed of all the categories 141-1 to 141-$m$ is changed, the user 10 pushes down the distribution button 130.

The configuration file generation function 220$a$ confirms the update flag (confirm whether it is true or false), and then forms the configuration files 310-1 to 310-$n$. Finally the intermediate configuration file 240$a$ is rendered persistent. The persistence of the intermediate configuration file 240$a$ is advantageous in that the information of the update flag is kept in storage even if the configuration files 310-1 to 310-$n$ are formed and disposed in failure, the configuration file integration base 200$a$ is reactivated to solve the problem, and then the failed configuration files 310-1 to 310-$n$ can be distributed again.

FIG. 10 shows a PAD for forming the configuration screen of the selected categories 141-1 to 141-$m$. The following processing is repeated in step 211 "repeat on all the setting formation". At first, a value that is set to <category> 526 is got in step 217 "get category of setting information from intermediate configuration file". The category name requested by a user is compared with the value that is set to <category>526 of the intermediate configuration file 240$a$ in step 218 "check coincidence between category of required configuration screen and category of setting information". If the check result is coincidence, the parameter name, input filed, and initial value are disposed on the configuration screen 110$a$ as in the case of the PAD for forming the configuration screen in the embodiment 1 (FIG. 5).

Figure 11:
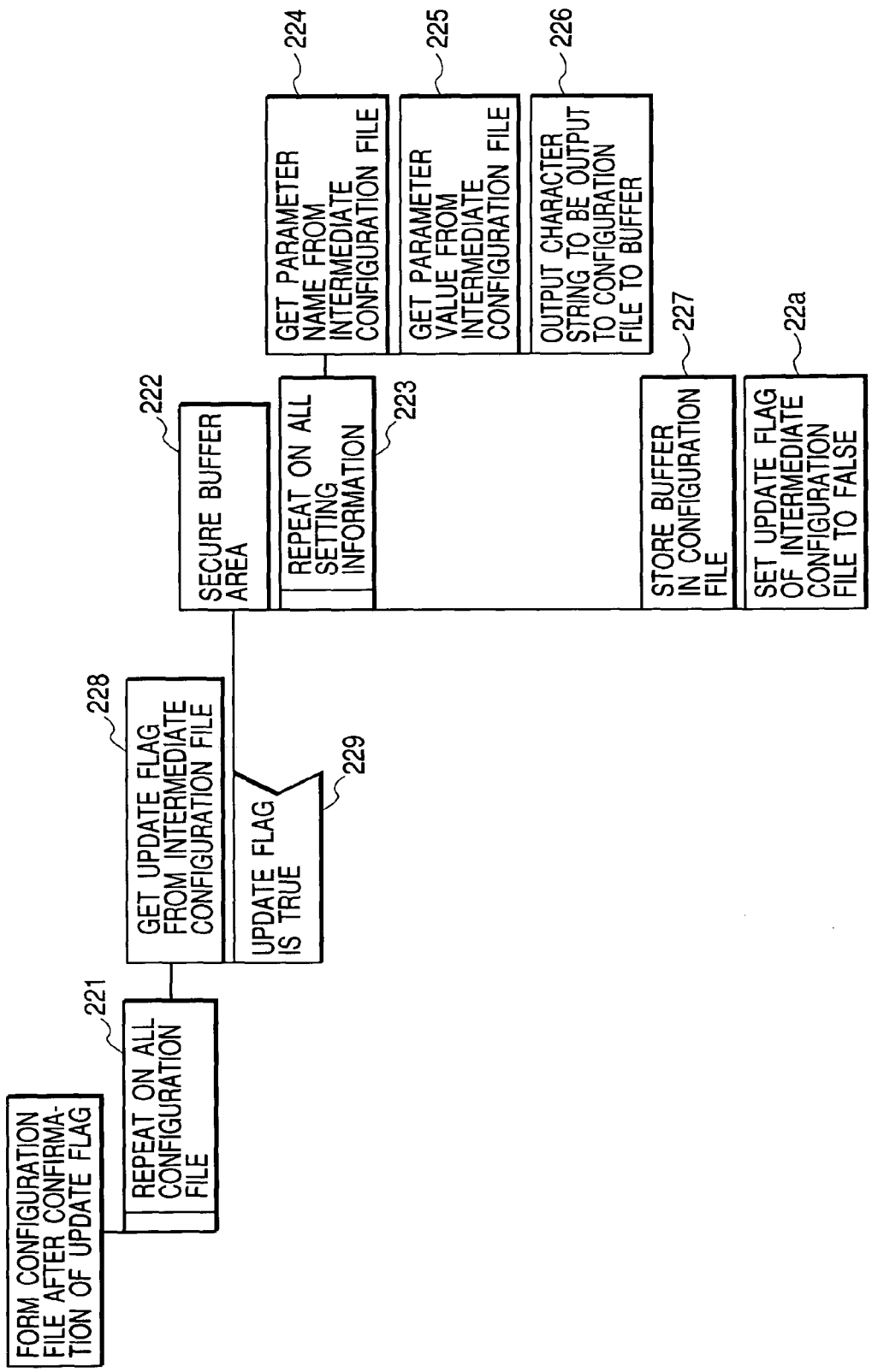
FIG. 11 is a PAD for forming a configuration file after update flag confirmation.

FIG. 11 shows a PAD for forming the configuration file after confirmation of the update flag. The following processing is repeated on each configuration file (<configuration file>510) in step 221 "repeat on all the configuration file". The value of the update flag (<updateflag> 513) is got in step 228 "get update flag from intermediate configuration file". Whether the got update flag is true or not is confirmed in step "confirm whether update flag is true or not". If the confirmation result is true, the configuration file is formed as in the case of the PAD for forming the configuration file in the embodiment 1 (FIG. 6) and the update flag is changed to false in step 22a "set update flag of intermediate configuration file to false".

Effect of Embodiment 2

Existence of the configuration screen 110 in respective categories 141-1 to 141-m obliges a user to wait for completion of configuration file forming and disposing every time when the user pushes the OK button 120 on each screen. The distribution button 130 allows a user to form and dispose the configuration file collectively after the user completes edition of the setting information of a plurality of configuration screens 110. As the result, troublesome edition work can be reduced.

Embodiment 3

Figure 12:
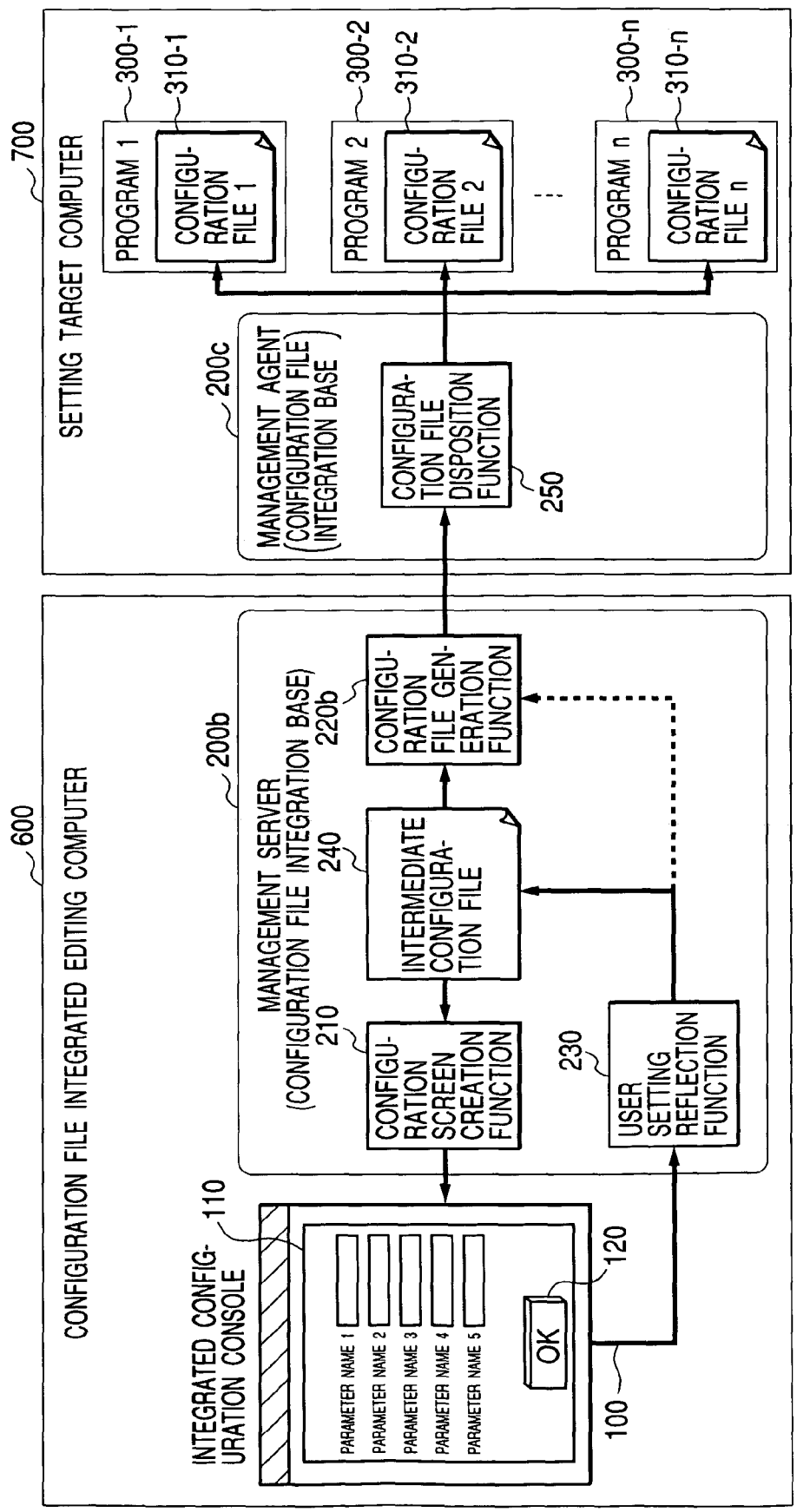
FIG. 12 is a system configuration diagram of the configuration file integrated editing method involving a plurality of computers;.

FIG. 12 shows a system configuration diagram in which the configuration file integration base 200 described in the embodiment 1 comprises a management server 200b and a management agent 200c, and the management server 200b and setting target programs 300-1 to 300-n are operated by respective computers.

A configuration file integrated editing computer 600 is provided with an integrated configuration console 100 and the management server 200b. The management server 200b is provided with a configuration screen creation function 210, configuration file generation function 220b, user setting reflection function 230, and intermediate configuration file 240. The setting target computer 700 is provided with the management agent 200c and programs 300-1 to 300-n. The management agent 200c has a configuration file disposition function 250. A plurality of setting target computers 700 may be provided.

Figure 13:
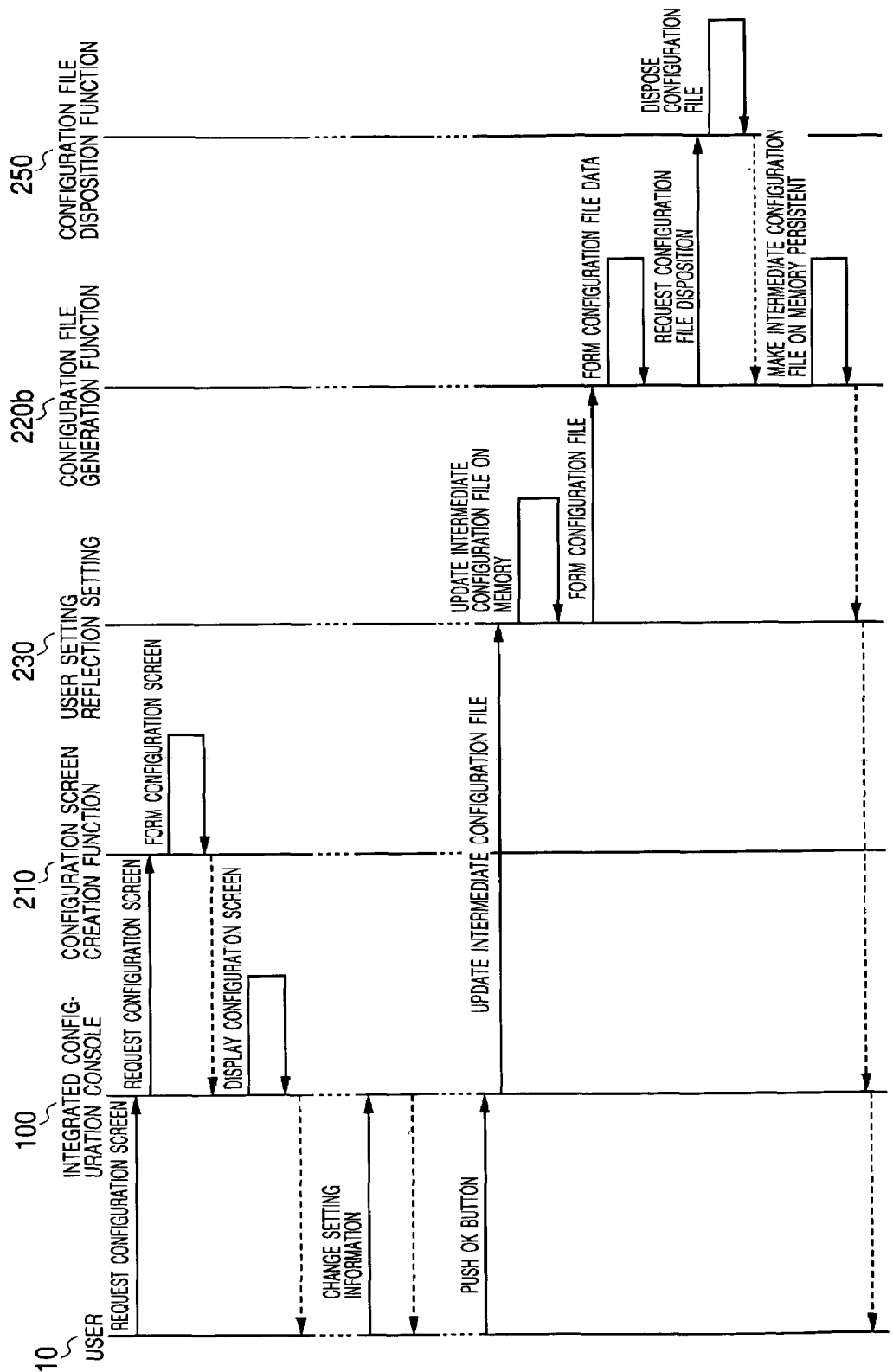
FIG. 13 is a diagram showing a process flow of the configuration file integrated editing method involving a plurality of computers.

FIG. 13 shows a sequence diagram of a process flow. A user 10 requests the configuration screen creation function 210 to form the configuration screen 110 through the integrated configuration console 100. The configuration screen creation function 210 forms a configuration screen 110 and returns it to the integrated configuration console 100. The integrated configuration console 100 displays the formed configuration screen 110. Next, the user 10 changes the setting information on the configuration screen 110 of the integrated configuration console 100. After changing of all the setting information to be changed is completed, the user 10 pushes the OK button 120. The user setting reflection function 230 updates the intermediate configuration file 240 on the memory. Next, the configuration file generation function 220 forms the configuration file data. The configuration file data is transferred to the configuration file disposition function 250, and the configuration file disposition function 250 stores the configuration files 310-1 to 310-n at the predetermined position. Finally the intermediate configuration file 240 on the memory 420 is rendered persistent.

Effect of Embodiment 3

The configuration file of a plurality of setting target computers 700 connected through a network can be edited by use of one configuration file integrated editing computer 600.

Embodiment 4

An embodiment will be described hereunder in which the configuration files 310-1 to 310-n are updated when the setting target programs 300-1 to 300-n involved in the embodiment 1 are executed.

Figure 14:
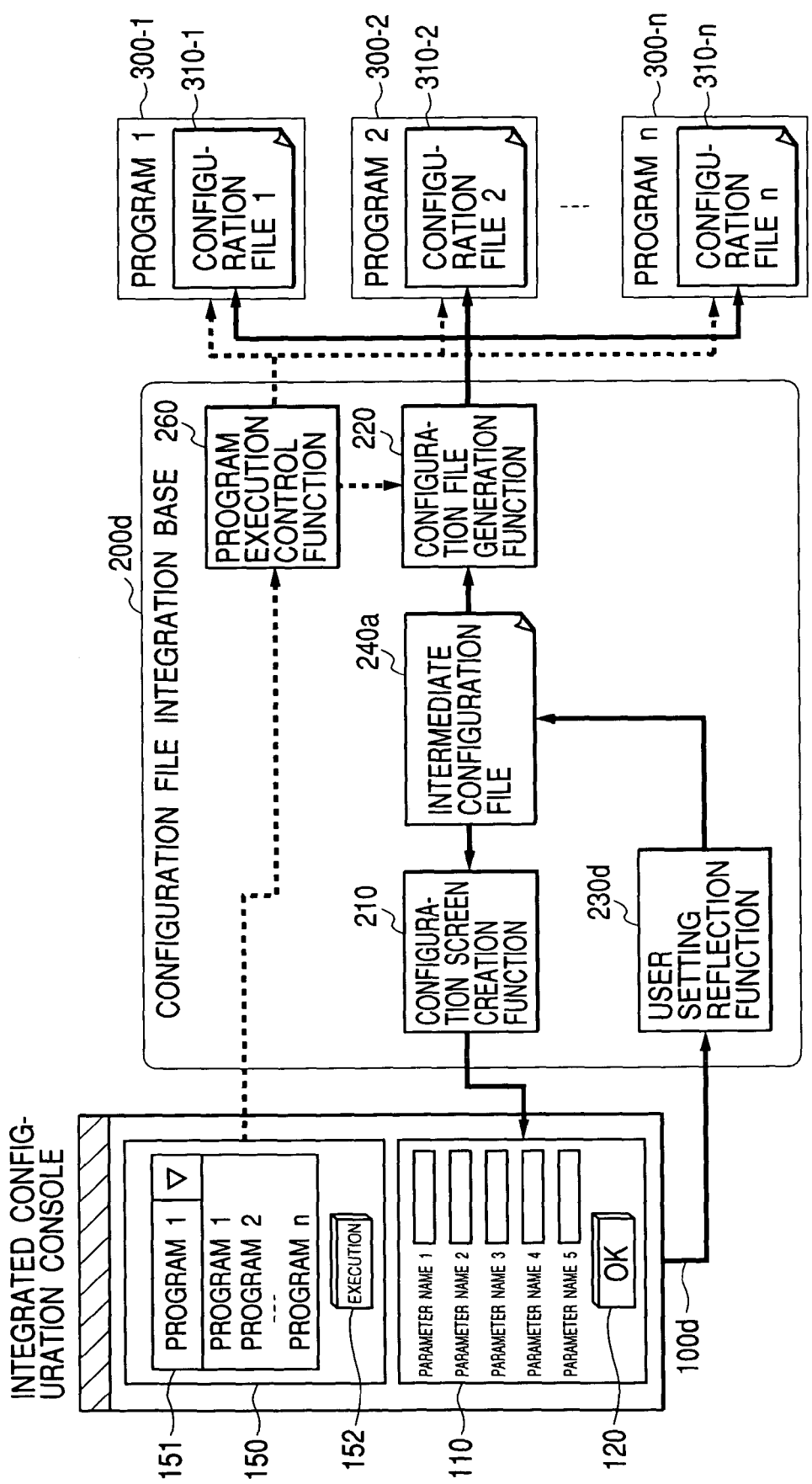
FIG. 14 is a system configuration diagram of the configuration file integrated editing method for updating the configuration file when a setting target program is executed.

FIG. 14 is a system configuration diagram. An integrated configuration console 100d comprises a program execution control screen 150 and configuration screen 110. The program execution control screen 150 is provided with a program selection box 151 and an execution button 152. When a user wants to execute a program, the user clicks an inverse triangle on the right side of the program selection box 151 to view a table of the programs 300-1 to 300-n, and select a desired program from among programs 300-1 to 300-n and then pushes the execution button 152. A configuration file integration base 200d is provided with a program execution control function 260. A configuration file generation function 220 is not called from a user setting reflection function 230d but called from the program execution control function 260. The program execution control function 260 can activate the setting target programs 300-1 to 300-n. The update flag (<updateflag>513) of the intermediate configuration file 240a involved in the embodiment 2 is used for detection of the configuration files 310-1 to 310-n to be updated.

Figure 15:
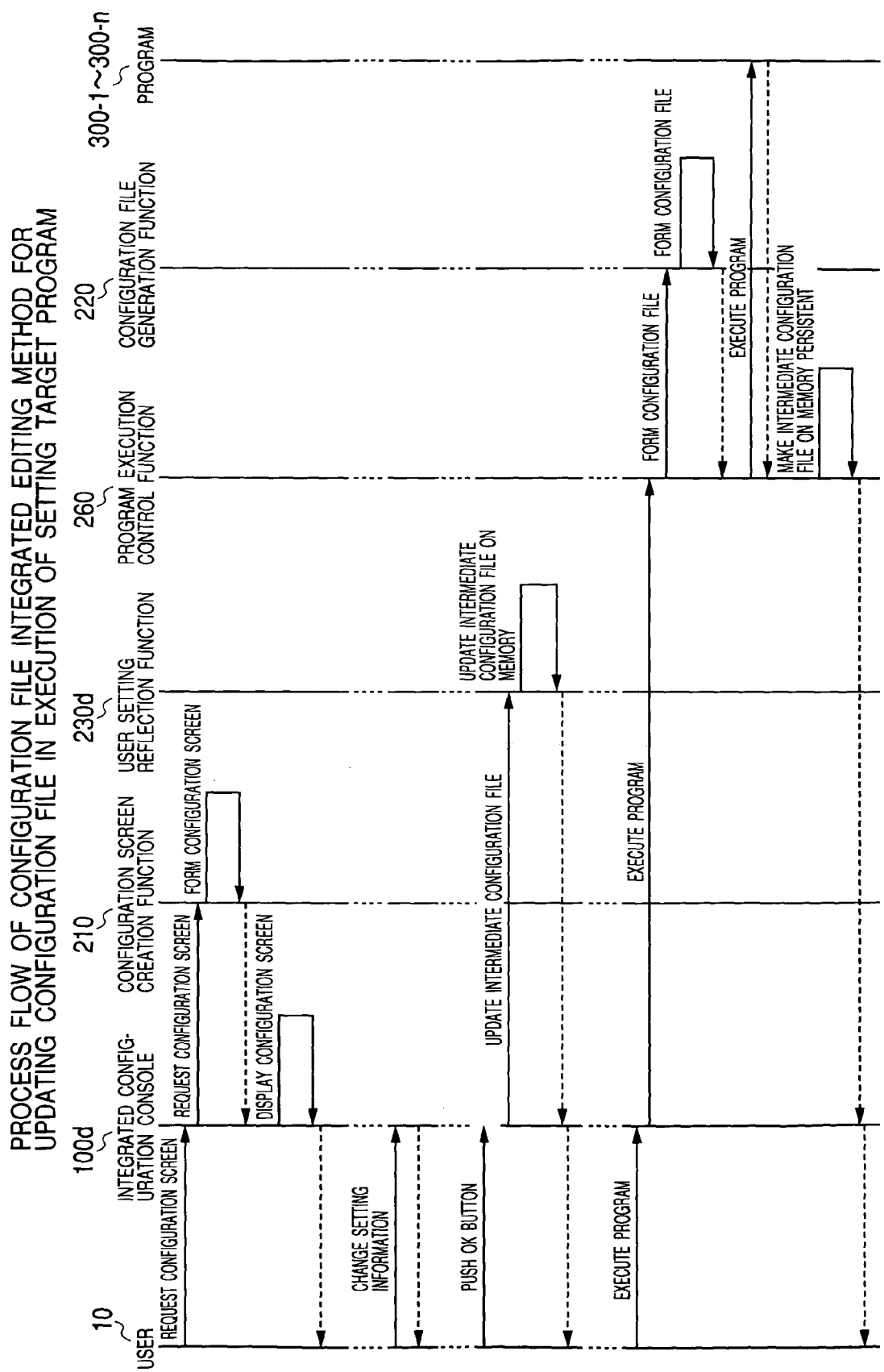
FIG. 15 is a diagram showing a process flow of the configuration file integrated editing method for updating the configuration file when a setting target program is executed.

FIG. 15 is a sequence diagram of the process flow. A user 10 requests the configuration screen creation function 210 to form the configuration screen 110 through the integrated configuration console 100. The configuration screen creation function 210 forms the configuration screen 110 and returns it to the integrated configuration console 100. The formed configuration screen 110 is displayed on the integrated configuration console 100. The user 10 updates the setting information on the configuration screen 110 of the integrated configuration console 100. After completion of changing of all the setting information to be changed, the user 10 pushes the OK button 120. The user setting reflection function 230d updates the intermediate configuration file 240a on the memory 420. When the user 10 wants to execute the programs 300-1 to 300-n, the user 10 requests execution by use of the integrated configuration console 100. Upon receiving the execution request, the program execution control function 260 requests the configuration file generation function 220 to execute the configuration files 310-1 to 310-n. The configuration file generation function 220 forms the configuration files 310-1 to 310-n. After the intermediate configuration file is updated as described herein above, the configuration file is updated when the program is executed. After the configuration file is formed, the program execution control function 260 executes the programs 300-1 to 300-n. Finally the intermediate configuration file 240 on the memory 420 is rendered persistent.

Effect of Embodiment 4

The waiting time is reduced in updating of the setting information by the user 10 because the configuration file is not formed and not disposed. It is probable that the user 10 does not push the distribution button 130 unconsciously after changing of the setting information in the embodiment 2, but it is certain that the configuration file is formed and disposed in this embodiment because the configuration files 310-1 to 310-n are updated in execution of the programs 300-1 to 300-n. As in the case of the embodiment 3, in the situation that the configuration files 310-1 to 310-n is distributed over a plurality of computers, the setting of the programs 300-1 to 300-*n* can be changed even when the computer is not being operated. The change is reflected on the configuration files 310-1 to 310-*n* in execution of the programs 300-1 to 300-*n*.

Embodiment 5

An embodiment of a configuration file integrated editing method will be described hereunder in which the programs 300-1 to 300-*n* is reactivated immediately after changing the programs 300-1 to 300-*n* to reflect the change of the configuration files 310-1 to 310-*n*, that is involved in the embodiment 1.

Figure 16:
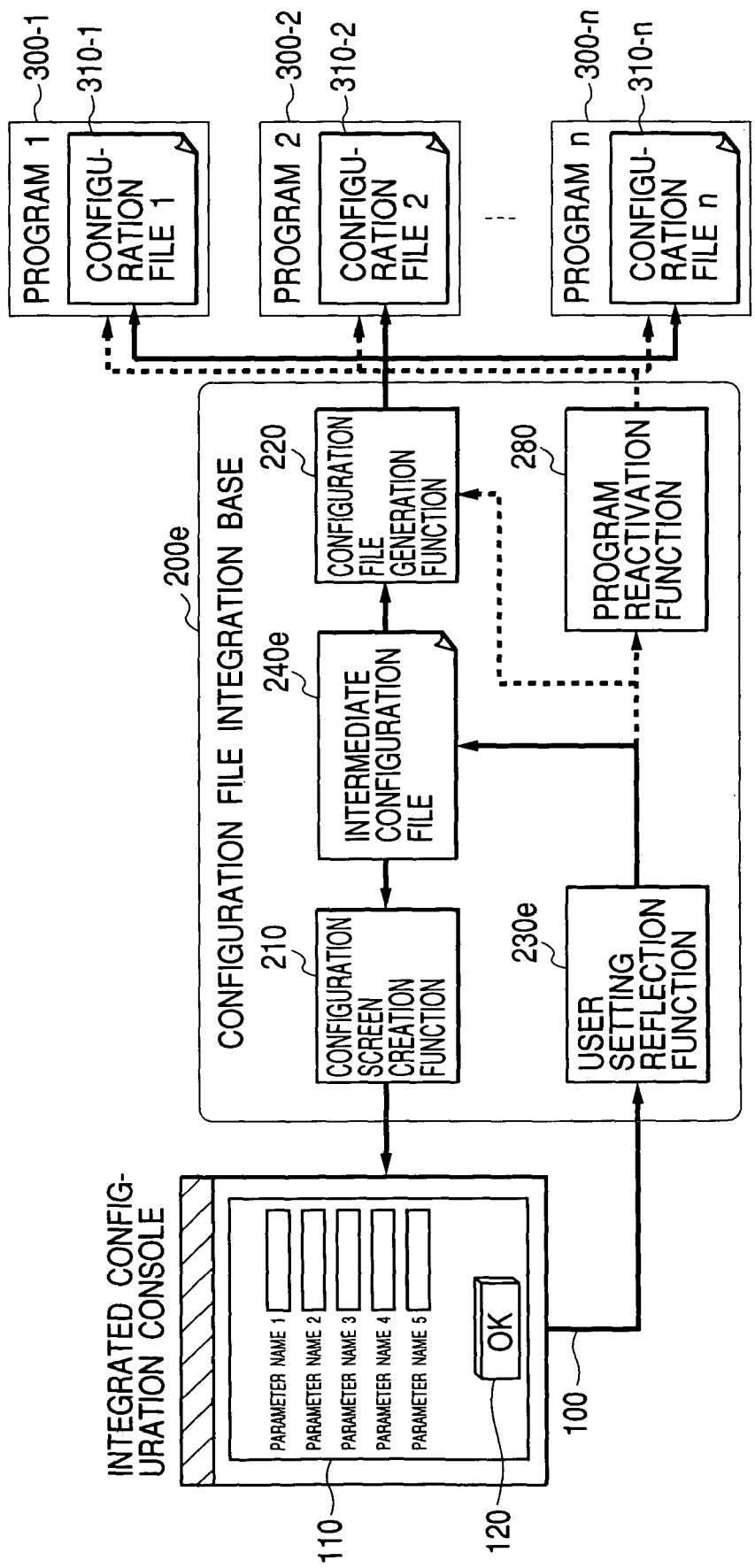
FIG. 16 is a system configuration diagram of the configuration file integrated editing method for automatic restert of a setting target program after the configuration file is changed.

FIG. 16 is a system configuration diagram. A program restert function 280 is added to the system configuration diagram of the embodiment 1 (FIG. 1). The program restert function 280 reactivates the programs 300-1 to 300-*n* that are in operation. The term "restert" means that the programs 300-1 to 300-*n* in operation are terminated temporarily and reactivated to reflect the change of the configuration file. A user setting reflection function 230 calls a configuration file generation function 220 and program restert function 280.

FIG. 17 shows an example of intermediate configuration file 240e. The name of the programs 300-1 to 300-*n* (<name>531~</name>531') and the configuration file of the programs 300-1 to 300-*n* (<configuration file>510) are stored in <program>530~</program>530'.

FIG. 18 shows a process flow of the configuration file integrated editing method for reactivating the programs 300-1 to 300-*n* after changing of the configuration files 310-1 to 310-*n*. The request for the configuration screen 110 is the same as that described in the embodiment 1, and the description is omitted. A user 10 changes the setting information on the configuration screen 110. After all the setting information to be changed on the configuration screen 110 is changed, the user 10 pushes the OK button 120. The user setting reflection function 230 updates the intermediate configuration file 240e on the memory 420. The user setting reflection function 230e requests the configuration file generation function 220 to form the configuration files 310-1 to 310-*n*. The configuration file generation function 220 forms the configuration file. Next, the user setting reflection function 230e gets the name of the programs 300-1 to 300-*n* (<name>531) that uses the formed configuration files 310-1 to 310-*n* from the intermediate configuration file 240e, and requests the program restert function 280 to reactivate the programs 300-1 to 300-*n*. Then, the programs 300-1 to 300-*n* in operation are terminated and reactivated.

Effect of Embodiment 5

It is assumed that the setting target programs 300-1 to 300-*n* are in operation. Furthermore, it is assumed that the restert of the programs 300-1 to 300-*n* is necessary to realize the update of the configuration files 310-1 to 310-*n* of the setting target programs 300-1 to 300-*n*. In the present embodiment, automatic restert of the programs 300-1 to 300-*n* after updating of the configuration files 310-1 to 310-*n* allows a user to work with less working.

Embodiment 6

A configuration file integrated editing method involving flexible configuration screen 110 and configuration files 310-1 to 310-*n* that are not flexible in the embodiment 1 will be described hereunder.

FIG. 19 is a system configuration diagram. In this embodiment, an integrated configuration console 100*f* comprises a category selection screen 140 and configuration screen 110, and the categories 141-1 to 141-*m* selected on the category selection screen 140 are set on the configuration screen 110. Though the configuration screen forming method (<method>524) and the output method to the configuration file (<cfformat>525) are included in the intermediate configuration file 240 in the embodiment 1, the equivalent information is included collectively in the configuration screen templates 211-1 to 211-*m* and configuration file templates 221-l to 221-*n*. The configuration screen templates 211-1 to 211-*m* and the configuration file templates 221-1 to 221-*n* are program codes executed by the configuration screen creation function 210*f* and the configuration file generation function 220*f*. As the result, the configuration screen 110 and configuration files 310-1 to 310-*n* are formed more flexibly (freely). The categories 141-1 to 141-*m* are provided with configuration screen templates 211-1 to 211-*m* respectively. The types of configuration files 310-1 to 310-*n* are provided with the configuration file templates 221-1 to 221-*n* respectively.

Preparation for configuration file integrated editing is described hereunder. At first, the setting information described in the configuration files 310-1 to 310-*n* is collected in the intermediate configuration file 240*f* and disposed in the configuration file integration base 200*f*. Next, the configuration screen templates 211-1 to 211-*m* for forming the configuration screen 110 of the categories 141-1 to 141-*m* of the integrated configuration console 100*f* is formed and disposed in the configuration screen creation function 210*f* of the configuration file integration base 200*f*. Finally, the configuration file templates 221-1 to 221-*n* to be utilized for forming the configuration files 310-1 to 310-*n* are formed, and disposed in the configuration file generation function 220*f* of the configuration file integration base 200*f*. When the configuration files 310-1 to 310-*n* are changed due to version up of the programs 300-1 to 300-*n* or added, these intermediate configuration file 240*f*, configuration screen templates 211-1 to 211-*n*, and configuration file templates 221-1 to 221-*n* are modified for coping with the change.

FIG. 20 shows an example of intermediate configuration file 240*f*. The configuration screen forming method (<method>524) and the output method to the configuration file (<cfformat>525) are omitted from the intermediate configuration file 240 that is described in the embodiment 1.

The process flow is described hereunder. A user 10 selects the categories 141-1 to 141-*m* to be set on the category selection screen 120. The processing carried out after the integrated configuration console 100*f* receives the information of the categories 141-1 to 141-*m* is the same as that shown in FIG. 3 described in the embodiment 1.

The configuration screen creation function 210*f* finds the configuration screen template 211-1 that forms the configuration screen 110 of the category 1 when the category 1 is selected, and calls the configuration screen forming method. The PAD of this method is the same as that shown in FIG. 5.

The configuration file generation function 220*f* finds out the configuration file templates 221-1 to 221-*n* of the configuration files 310-1 to 310-*n* included in the changed setting information, and calls the configuration file forming method. The configuration file forming method is the same as that shown in FIG. 6.

Detailed Example 1 of Embodiment 6

A detailed method for forming the configuration screen 110 according to the present embodiment in which a Web container that is executable of Java (registered trademark) Server Pages (JSP) is used as the configuration screen creation function 210f, JSP is applied on the configuration screen templates 211-1 to 211-n, Web browser is used for the integrated configuration console 100f, and a user selects the category 141-1 to 141-n on the integrated configuration console 100f, and consequently the Web container that is the configuration screen creation function 210f calls JSP that is the configuration screen templates 211-1 to 211-n to thereby form the configuration screen 110. The integrated configuration console 100f and the configuration file integration base 200f are operated by separate computers respectively.

Detailed Example 2 of Embodiment 6

A detailed method for forming the configuration files 310-1 to 310-n according to the present embodiment in which XSLT engine is used for the configuration file generation function 220f and XSL is used for the configuration file templates 221-1 to 221-n.

Effect of Embodiment 6

It is possible to form the configuration screen 110 and configuration files 310-1 to 310-n more flexibly by employing the configuration screen templates 211-1 to 211-n and the configuration file templates 221-1 to 221-n.

Embodiment 7

An embodiment for forming the configuration screen 110 that displays the parameter value candidate so as to ease input work by applying the embodiment 6 will be described for the case in which Web browser is used for the integrated configuration console 100f, a Web container that is executable of JSP is used for the configuration screen creation function 210, JSP is used for the configuration screen templates 211-1 to 211-n, and MXL is used for the intermediate configuration file 240 in the embodiment 6.

Figure 21:
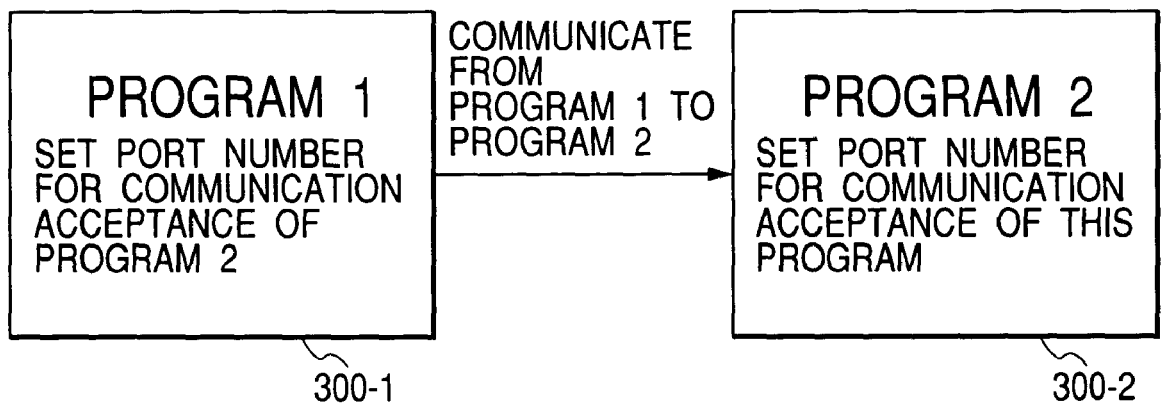
FIG. 21 is a diagram showing an example of relation between the program 1 and program 2.

FIG. 21 shows the relation between the setting target program 300-1 and the setting target program 300-2. The program 1 (300-1) is a program for communicating with the program 2 (300-2), and it is assumed that the port number of the program 2(300-2) must be set on the configuration file 1. Furthermore, it is assumed that the port number of the configuration file 2 (310-2) must be set. In this case, the intermediate file 240 is shown as FIG. 20.

Figure 22:
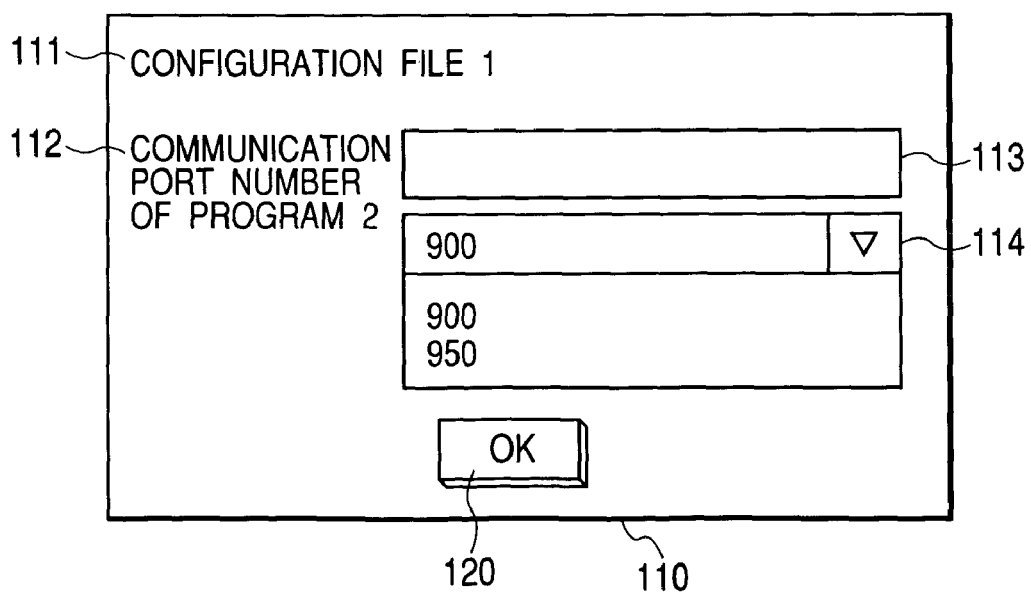
FIG. 22 is a diagram showing an example of configuration screen that displays candidates.

For example, when the configuration file 1 (310-1) is to be set in the category 1, JSP of the configuration file template (category 1) 211-1 forms the configuration screen 110 as shown in FIG. 22 with reference to the intermediate configuration file 240f shown in FIG. 20. The configuration screen 110 comprises the category name 111, parameter name 112, text input field 113, selection box 114, and OK button 120. 900 that is set currently in the range ≶value>522-1~≶/value>522'-1 becomes the default value of the selection box 114. The port number of the program 2 (300-2) set in the rage <value>522-2~</value>522'-2 is input in the selection box 114 as another candidate. When many candidates exist, the inverse triangle on the right side of the selection box 114 is pushed to display a list of candidates. The OK button 120 is pushed, and if a value is described on the text input field 113, then the value described on the text input field 113 is made effective. On the other hand, if a value is not set on the text input field 113, the value selected on the selection box 114 is effective.

Effect of Embodiment 7

Probable values that are set as the parameter value are displayed in the work for setting information on the configuration screen 110 to thereby save the user's setting work.

Embodiment 8

An embodiment provided to reduce the size of the intermediate configuration file 240 will be described hereunder. The example shown in FIG. 23 presents the intermediate configuration file 240 in which the same program 2 (300-2) is installed in a plurality of computers 400 and the configuration file 2 (310-2) is handled integrally. The computer name (computers 1 to 4) is stored in the range <hostname>514~</hostname>514'. As understood from the normal intermediate configuration file 240g shown in FIG. 23, it is assumed that 900 is set as the port number value in 520a-1 to 520a-3 in <parameter> of computers other than the computer 2 and that 950 is set as the port number in 520a-4 in <parameter> of the computer 2. At that time, the value that is used most often is used as a common value. The value is described in the section (520a-1 to 520a-4 in <parameter>) that stores the content of the configuration file 310-2 in the case of the normal intermediate configuration file 240g. As shown with arrows, the value that is common for the range <common>540~</common>540' is stored in 520b-1 in <parameter> in the case of the reduced-size intermediate configuration file 240h. The value is stored in <parameter>520-4 as in the case of the normal intermediate configuration file 240 because the computer 2 is different from the common value (setting can be different even if the program is the same). The size of the intermediate configuration file 240 is reduced by disposing the value that is used most often under <common>540~</common>540'.

Another Detailed Example of Embodiment 8

The default value of the setting information (values that a developer can set such as the number of simultaneous connection of a server, in addition to port number) is stored in <common>540~<common>540' to keep size of the intermediate configuration file 240 small in the present embodiment.

Effect of Embodiment 8

No storing of doubled values in the intermediate configuration file 240 enables the intermediate configuration file size 240 to be kept small.

According to the embodiments described herein above, it is possible to handle various types of program files in the same strategy without changing existing configuration files. Furthermore, when the configuration file is changed and/or added due to version up of the product or a new program is introduced, a product developer can cope with the change only by changing the intermediate configuration file. When the setting information of another computer is edited through a network, the program can be activated without depending on current operational condition of the configuration file integrated editing computer. The intermediate configuration file size can be reduced by extracting and writing values that are doubled in the intermediate configuration file on the common section in the intermediate configuration file.

When the setting information of another computer is to be edited through a network, only the intermediate configuration file in the configuration file integrated editing computer may be changed in edition. When the next activation request for the program that uses the setting information occurs, the intermediate configuration file is checked to confirm update of the setting information. If the setting information is updated, the configuration file is updated, and the program is activated. By applying the above mentioned method, the setting information can be changed without depending on current operational condition of the setting target computer. The setting target computer means a computer that stores the setting target program.

What is claimed is:

1. A configuration file integrated editing method comprising the steps of:
   forming an intermediate configuration file including data that describes a setting content of one or a plurality of types of configuration files to be used for changing operation of a program that is executable on a computer, data that describes a method for forming one or a plurality of types of configuration screens to be used for editing the configuration file, and data that describes a method for forming one or a plurality of types of configuration files;
   forming a configuration screen which is able to set various setting information of said configuration file from said intermediate configuration file;
   changing said intermediate configuration file when said setting information is changed on said configuration screen; and
   forming one or a plurality of types of configuration files from the changed intermediate configuration file,
   wherein a value that is used most often among a certain parameter value of said intermediate configuration file is described once as a common value in said intermediate configuration file, and
   wherein said certain parameter value is a default value that has been set previously by a developer who develops a setting target program.

2. The configuration file integrated editing method according to claim 1,
   wherein the step of forming one or a plurality of types of configuration files from the changed intermediate configuration file forms one or a plurality of types of configuration files that change the operation of the program if the setting information in said intermediate configuration file is changed when the program activation request occurs.

3. The configuration file integrated editing method according to claim 1, further comprising the step of;
   restarting said program to make the setting effective by means of a program restart function after one or a plurality of types of configuration files are formed and disposed on the program that uses the configuration file.

4. The configuration file integrated editing method according to claim 1, the step of forming a configuration screen which is able to set various setting information of said configuration file from said intermediate configuration file, further comprises the step of:
   displaying the setting information on the configuration screen that is probably set from among one or a plurality of types of setting information stored in the intermediate configuration file that is extracted as a candidate when said configuration screen is formed.

5. A configuration file integration base comprising:
   an intermediate configuration file that stores data for describing a setting content of one or a plurality of types of configuration files used for changing operation of a program that is executable on a computer, and data for describing a method for forming one or a plurality of types of configuration screens for editing a configuration file;
   a configuration screen creation function for forming a configuration screen on which a parameter value is input according to said intermediate configuration file; and
   a user setting reflection function for reflecting changed setting information input from said configuration screen on said intermediate configuration file,
   wherein a value that is used most often among a certain parameter value of said intermediate configuration file is described once as a common value in said intermediate configuration file, and
   wherein said certain parameter value is a default value that has been set previously by a developer who develops a setting target program.

6. The configuration file integration base according to claim 5,
   wherein said intermediate configuration file further stores data that describes a method for forming one or a plurality of types of configuration files, and
   wherein said intermediate configuration file is provided with a configuration file generation function far forming a configuration file according to said intermediate configuration file.

7. The configuration file integration base according to claim 6,
   wherein said configuration file generation function forms said configuration file in response to a configuration file forming request received from said user setting reflection function.

8. The configuration file integration base according to claim 6, further comprising:
   an OK button that is used for, after the setting information is changed, reflecting the change on said intermediate configuration file on said configuration screen; and
   a distribution button for forming a configuration file according to said intermediate configuration file after the change of all the setting information is reflected on said intermediate configuration file,
   wherein said user setting reflection function updates said intermediate configuration file in response to pushing down of said OK button, and
   wherein said configuration file generation function forms said configuration file in response to pushing down of said distribution button.

9. The configuration file integration base according to claim 6,
   wherein the configuration file integration base requests said configuration file generation function to form a configuration file, and gets a program execution control function for executing the program when the configuration file is formed.

10. The configuration file integration base according to claim 6,
    wherein the configuration file integration base has a program restart function for controlling restart of the program that makes an update of the configuration file of a program in execution effective after said configuration file is formed.

11. The configuration file integration base according to claim 5,
wherein said configuration screen creation function has a plurality of configuration screen templates.

12. The configuration file integration base according to claim 6,
wherein said configuration file generation function has a plurality of configuration file templates.

13. The configuration file integration base according to claim 5,
wherein the data describing said setting content that is used most often is described only once as a common value in said intermediate configuration file.

14. A configuration file integration base comprising:
an intermediate configuration file that stores data for describing a setting content of one or a plurality of types of configuration files used for changing operation of a program that is executable on a computer, and data for describing a method for forming one or a plurality of types of configuration screens for editing a configuration file;
a configuration screen creation function for forming a configuration screen on which a parameter value is input according to said intermediate configuration file; and
a user setting reflection function for reflecting changed setting information input from said configuration screen on said intermediate configuration file,
wherein said intermediate configuration file further stores data that describes a method for forming one or a plurality of types of configuration files,
wherein said intermediate configuration file is provided with a configuration file generation function for forming a configuration file according to said intermediate configuration file, and
wherein a configuration file disposition function provided in another computer disposes the configuration file formed by means of said configuration file generation function to the program.

15. A computer-readable storage medium having a recorded integrated editing program for controlling a computer to execute, in order to form the configuration file:
a procedure for grouping collectively data of an intermediate configuration file, where the data describes a setting content of one or a plurality of types of configuration files used for changing operation of a program that is executable on a computer, data that describes a method for forming one or a plurality of configuration screens used for editing the configuration file, and data that describes a method for forming one or a plurality of types of configuration files;
a procedure for forming a configuration screen for setting various setting information of said configuration file from said intermediate configuration file,
a procedure for changing said intermediate configuration file when said setting information is changed on said configuration screen; and
a procedure for forming one or a plurality of types of configuration files from the changed intermediate configuration file,
wherein a value that is used most often among a certain parameter value of said intermediate configuration file is described once as a common value in said intermediate configuration file, and
wherein said certain parameter value is a default value that has been set previously by a developer who develops a setting target program.

16. A configuration file integrated editing method comprising the steps of:
forming an intermediate configuration file including data that describes a setting content of one or a plurality of types of configuration files to be used for changing operation of a program that is executable on a computer, data that describes a method for forming one or a plurality of types of configuration screens to be used for editing the configuration file, and data that describes a method for forming one or a plurality of types of configuration files;
forming a configuration screen which is able to set various setting information of said configuration file from said intermediate configuration file,
changing said intermediate configuration file when said setting information is changed on said configuration screen;
forming one or a plurality of types of configuration files from the changed intermediate configuration file; and
disposing by a configuration file disposition function provided in another computer the configuration files formed to the program,
wherein a value that is used most often among a certain parameter value of said intermediate configuration file is described once as a common value in said intermediate configuration file, and
wherein said certain parameter value is a default value that has been set previously by a developer who develops a selling target program.

* * * * *